United States Patent [19]

Bahl et al.

[11] Patent Number: 5,033,087
[45] Date of Patent: Jul. 16, 1991

[54] METHOD AND APPARATUS FOR THE AUTOMATIC DETERMINATION OF PHONOLOGICAL RULES AS FOR A CONTINUOUS SPEECH RECOGNITION SYSTEM

[75] Inventors: Lalit R. Bahl, Amawal; Peter F. Brown, New York; Peter V. DeSouza; Robert L. Mercer, both of Yorktown Heights, all of N.Y.

[73] Assignee: International Business Machines Corp., Armonk, N.Y.

[21] Appl. No.: 323,479

[22] Filed: Mar. 14, 1989

[51] Int. Cl.5 .............................................. G01L 7/08
[52] U.S. Cl. ....................................................... 381/43
[58] Field of Search .................................. 381/41-46; 364/513.5

[56] References Cited

U.S. PATENT DOCUMENTS

| | | | |
|---|---|---|---|
| 4,091,237 | 5/1978 | Wolnowsky | 179/15 C |
| 4,181,821 | 1/1980 | Pirz | 179/15 D |
| 4,307,446 | 12/1981 | Barton | 364/200 |
| 4,319,085 | 3/1982 | Welch | 119/150 |
| 4,466,060 | 8/1984 | Riddle | 364/200 |
| 4,535,473 | 8/1985 | Sakata | 381/46 |
| 4,759,068 | 7/1988 | Bahl et al. | 381/43 |
| 4,827,521 | 5/1989 | Bahl et al. | 381/43 |
| 4,833,712 | 5/1989 | Bahl et al. | 381/43 |
| 4,837,831 | 6/1989 | Gillick et al. | 381/43 |
| 4,852,173 | 7/1989 | Bahl et al. | 381/43 |

OTHER PUBLICATIONS

"An Information Theoretic Approach to the Automatic Determination of Phonemic Baseforms," J. M. Lucassen et al., Proceeding of the International Conference on Acoustics, Speech & Signal Processing, 1984, pp. 42.5.1-42.5.4.

"A Maximum Likelihood Approach to Continuous Speech Recognition", L. R. Bahl et al., IEEE Transactions on Pattern Analysis and Machine Intelligence, vol. 5, No. 2, Mar. 1983, pp. 170-190.

"Continuous Speech Recognition with Automatically Selected Acoustic Prototypes Obtained by Either Bootstrapping or Clustering," A. Nadas et al., Proceedings of the International Conference on Acoustics, Speech & Signal Processing, 1981, pp. 1153-1155.

"Continuous Speech Recognition by Statistical Methods," F. Jelinek, Proceedings of the IEE, vol. 64, 1976, pp. 532-556.

"Minimum Prediction Residual Principle Applied to Speech Recognition," F. Itakura, IEE Transactions on Acoustics, Speech & Signal Processing, vol. 23, 1975, pp. 67-72.

Primary Examiner—Gary V. Harkcom
Assistant Examiner—John A. Merecki
Attorney, Agent, or Firm—Ratner & Prestia

[57] ABSTRACT

A continuous speech recognition system includes an automatic phonological rules generator which determines variations in the pronunciation of phonemes based on the context in which they occur. This phonological rules generator associates sequences of labels derived from vocalizations of a training text with respective phonemes inferred from the training text. These sequences are then annotated with their pheneme context from the training text and clustered into groups representing similar pronunciations of each phoneme. A decision tree is generated using the context information of the sequences to predict the clusters to which the sequences belong. The training data is processed by the decision tree to divide the sequences into leaf-groups representing similar pronunciations of each phoneme. The sequences in each leaf-group are clustered into sub-groups representing respectively different pronunciations of their corresponding phoneme in a give context. A Markov model is generated for each sub-group. The various Markov models of a leaf-group are combined into a single compound model by assigning common initial and final states to each model. The compound Markov models are used by a speech recognition system to analyze an unknown sequence of labels given its context.

24 Claims, 16 Drawing Sheets

PRIOR ART FIG.1

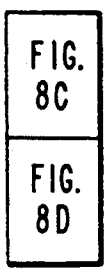
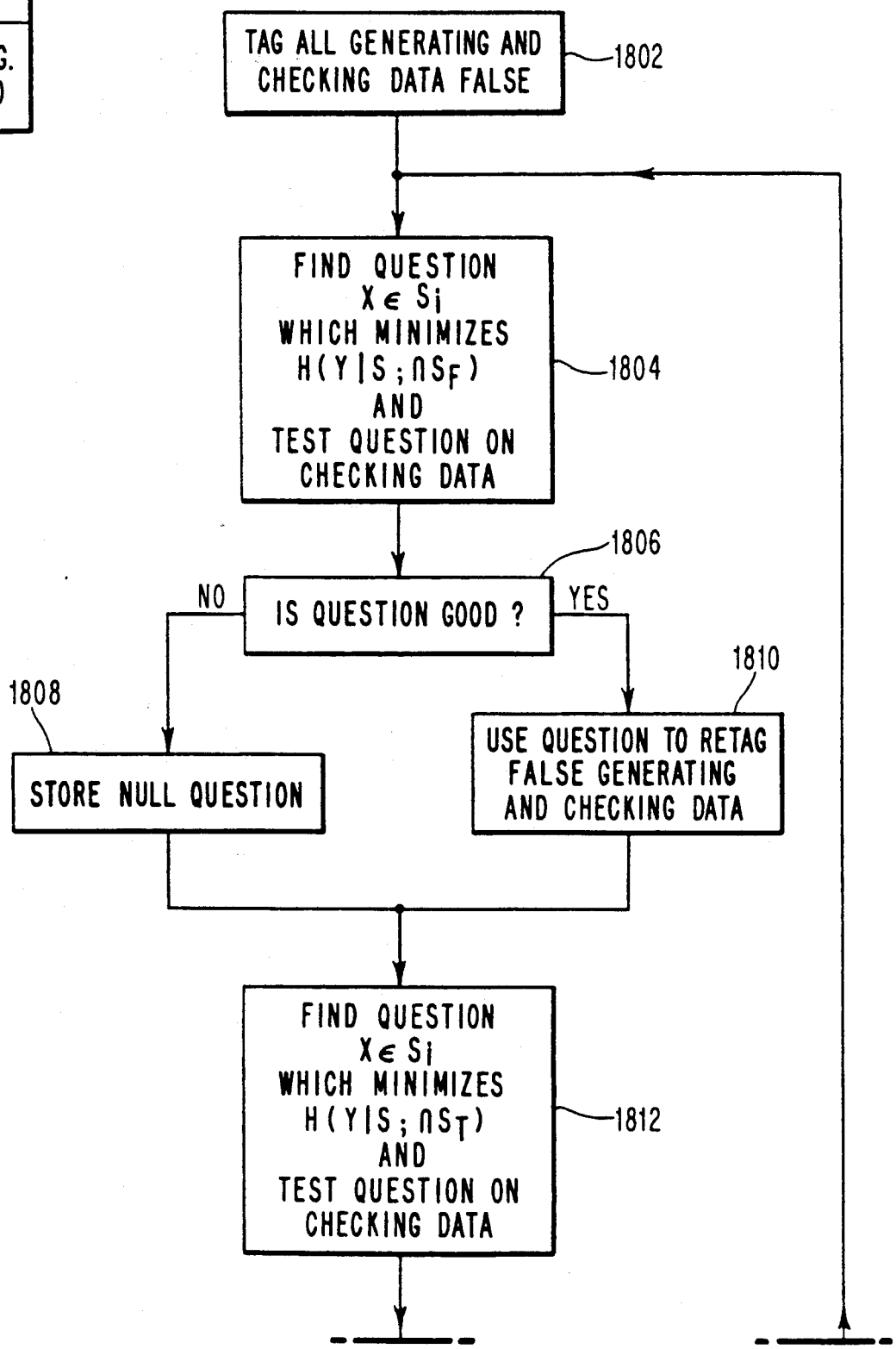

METHOD AND APPARATUS FOR THE AUTOMATIC DETERMINATION OF PHONOLOGICAL RULES AS FOR A CONTINUOUS SPEECH RECOGNITION SYSTEM

BACKGROUND OF THE INVENTION

1. Field of the Invention

The present invention relates generally to the field of speech recognition and specifically to a method and apparatus for processing speech information to automatically generate phonological rules which may be used, for example, to facilitate the recognition of continuous speech.

2. Description of the Prior Art

Most speech recognition systems operate, at least at a high level of abstraction, in substantially the same manner. Discontinuous spoken words are converted to sampled data electrical signals which are then analyzed to generate a sequence of tokens representing specific sounds. These tokens are analyzed to determine which word or words correspond to the sequence of tokens. The words so determined are provided as the output of the speech recognition system.

Many speech recognition systems of this type analyze only discontinuous speech, that is to say words spoken with interstitial pauses. This limitation makes the systems easier to design since phonological models of words spoken in this manner tend to be more consistent than the rules which may apply for the more natural continuous speech. These phonological models are used in the analysis of the sampled electrical signals.

An exemplary system for recognizing discontinuous spoken words is described below in reference to FIGS. 1-4, labeled "prior art." In the described system, each word in a prescribed vocabulary is represented as a sequence of component parts known as phonemes. Each of these sequences is known as a "baseform" and represents an idealized pronunciation of the word. Traditionally, Phonetic-baseforms have been generated by phoneticians.

In the system described below, each phoneme in a baseform is represented by a statistical model called a "phonemic phone machine." A phonemic phone machine represents a phoneme as a probabilistic combination of sound samples called "fenemes" or, more simply, "labels." Statistics are developed for each phone machine by analyzing a known spoken text. Some known speech recognition systems use baseforms which have fenemes rather than phonemes as their component parts. In this instance, a fenemic phone machine, i.e. one in which each feneme is represented as a probabilistic combination of fenemes, is used to model the pronunciation of the feneme. The exemplary system shown in FIGS. 1-4 uses phonemic baseforms and phonemic phone machines.

Once the statistics for the phone machines have been developed, they may be used to analyze the sampled data signal representing fenemes derived from individually uttered words to determine one or more likely sequences of phonemes that correspond to the sampled data signal.

This sequence of phonemes is then compared to selected ones of the baseforms, which incorporate the likely sequences of phonemes, to decide which words from the prescribed vocabulary are most likely to have been spoken.

This type of voice recognition system works reasonably well for discontinuous speech because individually spoken words tend to conform to the idealized baseforms. However, in continuous speech, coarticulation among the words tends to reduce the conformance of a spoken word to any idealized model, such as a baseform.

A phonetic baseform may be compensated for coarticulation effects by specifying rules which change the baseform based on the context in which it is pronounced. Typically, these rules are also specified by phoneticians. But, due to the wide variety of coarticulation effects which may occur even in a limited vocabulary, the specification of these modifying rules can be a formidable task.

U.S. Pat. No. 4,759,068 to Bahl et al. relates a method by which a string of tokens derived from spoken words are analyzed to derive a sequence of individual fenemes which most closely corresponds to the spoken words. This patent discloses the structure of a typical speech recognition system in detail.

U.S. Pat. No. 4,559,604 to Ichikawa et al. relates to a pattern recognition system in which an input pattern is compared against a set of standard patterns to define a set of patterns that are more likely than any other patterns to be a match for the input pattern. A specific one of these selected patterns is inferred as the most likely based on one of four preferred criteria of inference.

U.S. Pat. No. 4,363,102 to Holmgren et al. relates to a speaker identification system which develops a plurality of templates corresponding to known words spoken by a corresponding plurality of speakers. An individual speaker is identified as having the smallest probabilistic distance between his spoken words and the templates corresponding to one of the known speakers.

SUMMARY OF THE INVENTION

It is an object of the invention to provide a method and apparatus for automatically generating phonological rules which describe differences in pronunciation of a set of words based on the context in which the words are spoken.

It is a further object of the invention to utilize these phonological rules to recognize continuously spoken words.

The present invention is embodied in a continuous speech recognition system which includes a set of language components that describe a predetermined vocabulary of words. Vocalizations corresponding to a known text are processed to associate samples, representing the vocalizations, with the language components. The samples associated with language components that are phonologically similar are clustered to determine different pronunciations of that component. These samples are then processed to develop a decision mechanism which relates the clusters to data indicating the contextual occurrence of the language components represented by the samples. This decision graph defines phonological rules which describe variations in the pronunciation of the various language components due to the context in which the component occurs.

BRIEF DESCRIPTION OF THE DRAWINGS

FIGS. 8C and 8D are flow-chart diagrams illustrating a method for constructing a binary decision tree having pylonic conditions, which may be used in the rules generator shown in FIG. 5.

DETAILED DESCRIPTION

In isolated speech recognition, good results can be obtained with one static acoustic model for each word in a vocabulary. Since there is only neglibible coarticulation between words that are spoken in isolation, the pronunciation of any given word changes very little from one instance to the next and so, the pronunciation of the word is adequately represented by a static model.

In continuous speech recognition, however, a single static acoustic model is inadequate. This is due to the substantial coarticulation among words that are spoken without interstitial pauses. Thus, each word may have many possible pronunciations.

One way to deal with this variability is to employ phonological rules to model the effects of coarticulation. Using these rules, there is still a single acoustic model for each word in the vocabulary, but it is no longer static. Each word model represents the pronunciation of a word in the absence of coarticulation and is called a baseform. The phonological rules operate on the baseforms, transforming them where appropriate, to reflect the effects of coarticulation. Consequently, the actual word models used by the speech recognition system can vary dynamically according to the context in which the word occurs.

The success of this approach clearly depends on the accuracy and sufficiency of the phonological rules. Traditionally, phonological rules have been created manually by linguists skilled in the art of phonetics. But generating a complete set of phonological rules for even a relatively small vocabulary can be a very large task.

The embodiment of the invention described below includes an automatic phonological rules generator which, by analyzing a training text and corresponding vocalizations, can generate a set of phonological rules. These rules are applied to a speech recognition system in the embodiment described below. They may also be applied to a speech synthesis system, to change the pronunciation of a word depending on its context, or they may simply be analyzed by linguists to increase their knowledge of this arcane art.

Figure 1:
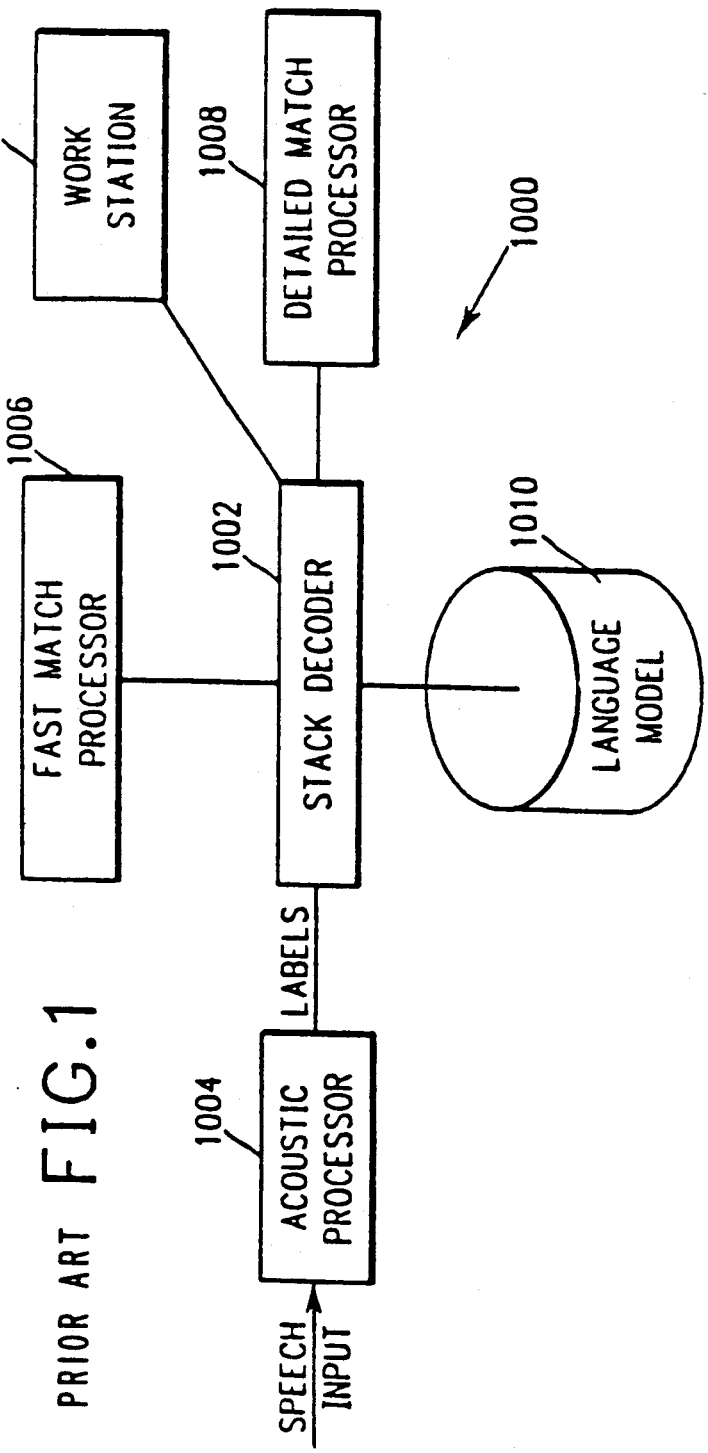
FIG. 1 (prior art) is a block diagram of a known speech recognition system.

To describe how phonological rules may be used in a continuous speech recognition system, it is helpful to first describe a system for recognizing isolated speech. FIG. 1 is a block diagram of a speech recognition system such as is disclosed in U.S. Pat. No. 4,759,068 to L. R. Bahl et al., which is hereby incorporated by reference. This system is described briefly below and then, as appropriate, selected aspects of the system are described in more detail.

In the system shown in FIG. 1, speech input, provided by a microphone and amplifier (not shown) are applied to an- acoustic processor 1004. The processor 1004 analyzes the spectral characteristics of speech input over a succession of 1 centisecond intervals and assigns a label (i.e. a feneme) to each interval. The labels are selected by the acoustic processor from an alphabet of distinct labels based on some combination of characteristics of the input speech during the centisecond intervals.

The labels produced by the acoustic processor 1004 are applied to a stack decoder 1002. The decoder 1002 interfaces with a fast match processor 1006, a detailed match processor 1008, a language model 1010 and a work station 1012. The decoder 1002 is controlled via the work station 1012 to condition the detailed and fast match processors 1008 and 1006 and the language model 1010 to transform the sequence of fenemes into a sequence of words which are provided to the work station 1012.

The fast match processor 1006 and the detailed match processor 1008 use respectively different sets of probabilistic finite state machines, i.e. phone machines, to associate the feneme sequences with words from a fixed vocabulary. The fast match processor 1006 uses a set of relatively crude phone machines to quickly select a few of the more likely words from the vocabulary. The detailed match processor uses a more rigorous set of phone machines to select a most likely word from the few provided by the fast match processor.

Since the fast match processor 1006 and detailed match processor 1008 produce matches based only on the speech input during the time interval occupied by a spoken word, the words produced are in terms of their phonetic content. Consequently, the output values provided by the detailed match processor may represent a group of homophones. The homophones provided by the detailed match processor 1008 may be true homophones or near-homophones. A word is a near-homophone to another word if, even though it is not a true homophone, it cannot be reliably distinguished from the other word on the basis of the signals provided by the acoustic processor 1004, using the probabilistic techniques employed by the detailed match processor. An example of a near-homophone pair are the names of the letters "B" and "D". To avoid confusion, any use of the term "homophone" in this specification includes the concept of a near-homophone.

The language model 1010 is used to determine which word is correct from a group of homophones. The language model 1010, used in this embodiment of the invention, determines which word of a group is the most likely based on the the preceeding two words derived by the speech recognition system. The words determined by this language model analysis are the output of the speech recognition system.

Figure 2:
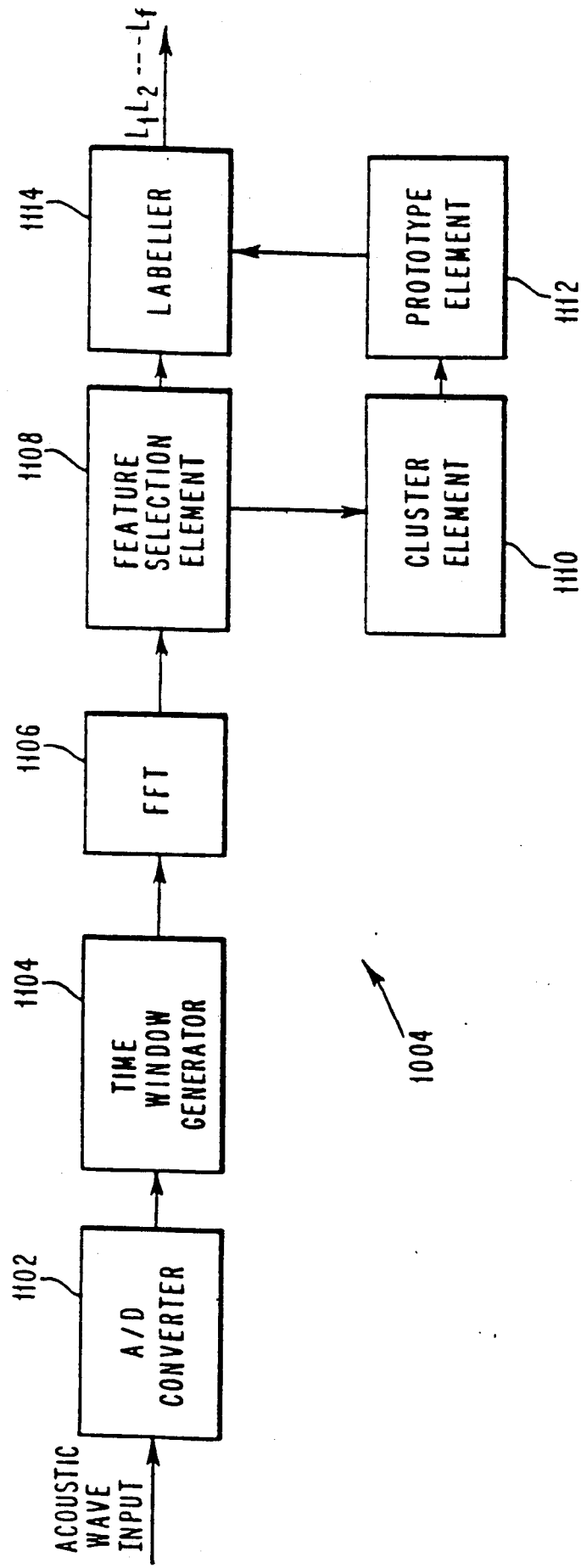
FIG. 2 (prior art) is a block diagram of an acoustic processor suitable for use with the speech recognition system shown in FIG. 1.

FIG. 2 is a block diagram of apparatus suitable for use as the acoustic processor 1004. In FIG. 2, an analog electrical signal, representing an acoustic wave input (e.g. natural speech), is applied to an analog-to-digital converter (ADC) 1102. The ADC 1102 develops digital samples representing the acoustic wave at a prescribed rate. A typical sampling rate is one sample every 50 microseconds. The samples provided by the ADO 1102 are applied to a time window generator 1104 which divides the digital samples into overlapping groups of, for example, 400 samples. The groups of digital samples provided by the time window generator 1104 are applied to a fast Fourier transform (FFT) element 1106.

The FFT element 1106 processes the sample groups to provide a signal SA which includes a sequence of spectral vectors. Each of these vectors may be, for example, a set of 200 output signals which represent the power of the acoustic wave in 200 mutually distinct frequency bands. Each spectral vector represents the acoustic wave during a 10 millisecond (1 centisecond) interval.

The signal SA provided by the FFT element 1106 is then processed to produce labels (or fenemes), y1, y2, . . . yf. Four processing elements, a feature selection element 1108, a cluster element 1110, a prototype element 1112, and a labeller 1114, act together to produce the fenemes from the signal SA. These elements operate in two modes, a training mode and a labeling mode. In both modes, the feature selection element 1108 combines selected values of the vector signal SA to generate a vector, AF, of acoustic feature signals. In addition to the power level of a particular frequency, an element in the acoustic feature vector may represent, for example, the overall loudness of the signal; the loudness in a particular band of frequencies; or an indication of when the acoustic input is above a threshold of feeling, $T_f$, or a threshold of hearing, $T_h$.

In a training mode, the acoustic feature vectors produced from a relatively large set of acoustic inputs are generated and stored in the cluster element 1110. If each of these stored vectors is considered to be a point in a state-space defined by a state vector of possible acoustic features, then the set of all points produced by the training data may be grouped into clusters of points in the state-space. Each point in a given cluster represents a one centisecond sample of a vocal sounds which is statistically similar to the sounds represented by the other points in the cluster.

Each of the clusters in the state-space may be thought of as a being representative samples of a probability distribution. Each of these probability distributions, which may, for example be assumed to be Gaussian distributions, defines a prototype for a label or feneme. When the acoustic processor 1004 is in its training mode, the cluster element provides the clusters to the prototype element which fits a Gaussian distribution to each cluster, defining a prototype label which represents all points in the cluster. When the acoustic processor is in its labeling mode, these prototypes are used by the labeller 1114 to assign labels to the feature vectors produced by the feature selection element 1108. An exemplary system for generating prototype labels in this manner is disclosed in a paper by A. Nadas et al., "Continuous Speech Recognition With Automatically Selected Acoustic Prototypes Obtained By Either Bootstrapping Or Clustering", *Proceedings of the ICASSP* 1981, pp. 1153-1155.

Figure 3:
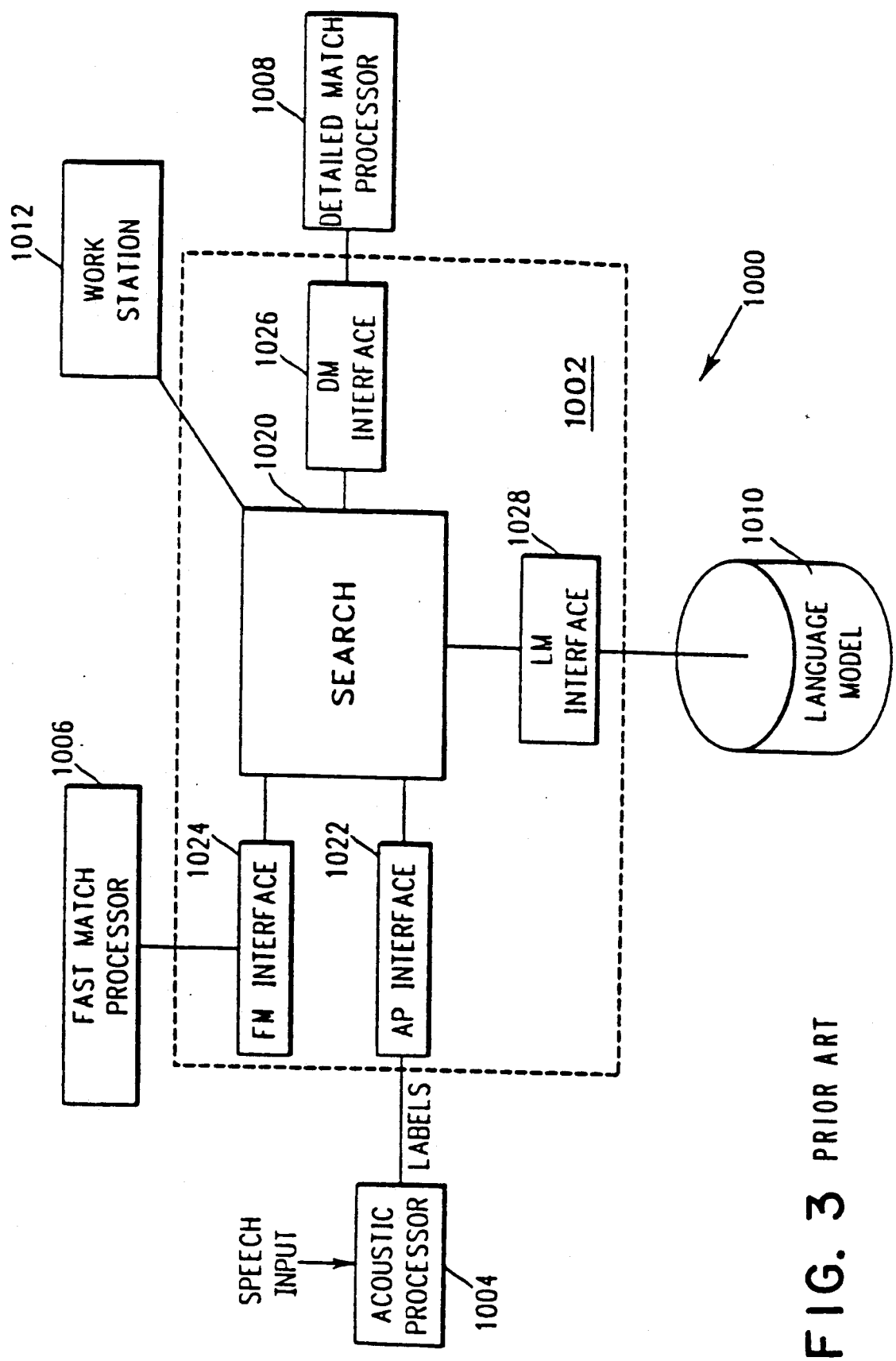
FIG. 3 prior art) is a block diagram of the speech recognition system shown in FIG. 1 showing more detail of the stack processor element.

FIG. 3 is a block diagram of the speech recognition system shown in FIG. 1 but showing the stack decoder 1002 in greater detail. The central element in the stack decoder is a search processor 1020. As set forth above, when a sequence of labels is applied to the stack decoder, the search processor 1020 first applies it to the fast match processor 1006. The processor 1006 eliminates all but a few of the more likely words in the vocabulary as matches for the sequence of labels. The words determined by the fast match processor 1006 are then applied by the search processor 1020 to the detailed match processor along with the sequence of labels. The detailed match processor 1020 determines which of these supplied words is the most likely to correspond to the supplied sequence of labels.

The methods implemented by the search processor 1020, fast match processor 1006, detailed match processor 1008 and language model 1010, used in the present embodiment of the invention, are substantially the same as those set forth in the above referenced U.S. Pat. No. 4,759.068. An exemplary implementation is described below.

In the recognition system shown in FIG. 3, each word in a dictionary is represented as a sequence of phonemes and each phoneme is represented by a phone machine. A phone machine is a Markov model of the pronunciation of a phoneme which defines a probabilistic relationship between the phoneme and a sequence of labels.

In the fast match operation, the sequence of labels produced by the acoustic processor 1004 is matched, by the fast match processor 1006, to simplified phone machines representing words in the vocabulary. These words are arranged in a tree structure for use by the processor 1006, so that words having common initial phonemes have common paths through the tree until they are differentiated. The fast match processor 1006, provides a set of words that are more likely to match the sequence of labels than other words in the vocabulary. These words are then analyzed by the language model 1010 to eliminate any words that are unlikely based on their context in view of, for example, the two most recently recognized words. This process produces a relatively small set of candidate words which are then applied, with the sequence of labels provided by the acoustic processor 1004, to the detailed match processor 1008.

The detailed match operation uses a set of more rigorous phone machines to match the labels provided by the acoustic processor 1004 to the set of candidate words. Exemplary phone machines which may be used by the detailed match processor are described below in reference to FIGS. 4A and 4B. Following this description, modifications to this phone machine to produce simplified phone machines for the fast match processor 1006 are described.

Figure 4A:
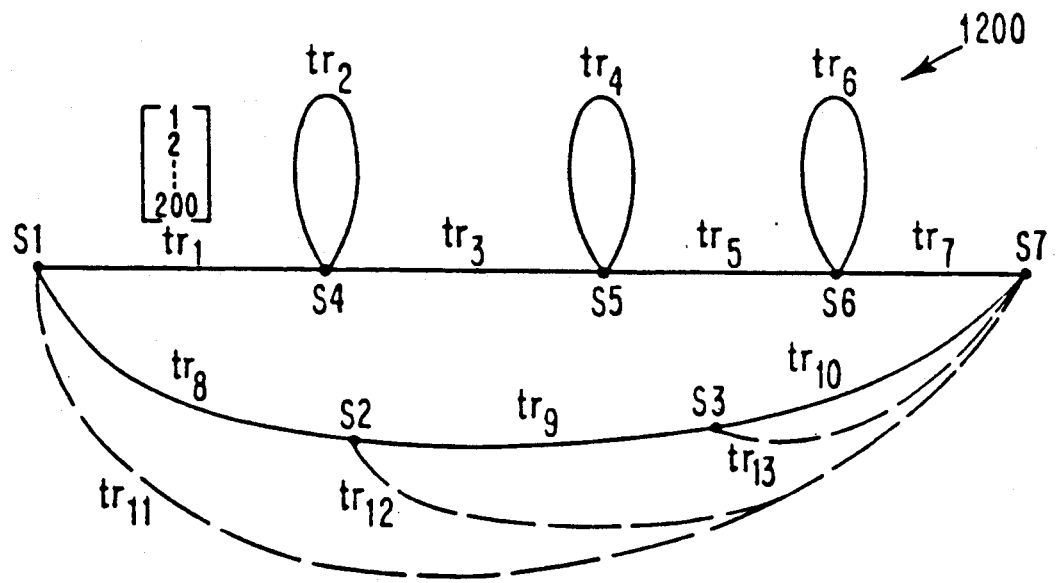
FIGS. 4A and 4B (both prior art) are state diagrams representing Markov models which may be used in several contexts by the speech recognition system shown in FIG. 1 and in the embodiment of the present invention.

A phonemic phone machine 1200 is shown in FIG. 4A. This phone machine models the pronunciation of a phoneme as a Markov process. Phonemic phone machines are concatenated, as indicated by a phonetic baseform, to produce a Markov model of the pronunciation of a word.

The phone machine 1200 includes seven states, S1 through S7, and 13 transitions, tr1 through tr13, between selected ones of the states. Each transition has a probability associated with it and, in addition, each of these transitions except the ones indicated by broken lines (i.e. tr11, tr12, and tr13) has associated with it a vector of 200 probability values representing the probability that each of the respective 200 possible labels occurs at the transition. The broken-line transitions represent transitions from one state to another in which no label is produced. These transitions are referred to as null transitions. The solid-line transitions represent vocalizations in a transition from one state to another. The broken-line transitions represent transitions from one state to another which take no time to complete and for which there is no vocalization, in other words, in which a label is absent from the word model. Where a transition both begins and ends in one state, it 7 represents a vocalization that is held for more than one sample period (i.e. 1 centisecond).

Figure 4B:
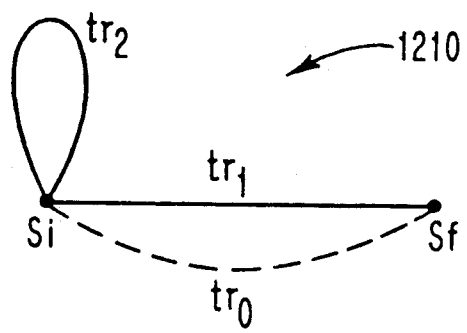

A fenemic phone machine 1210 is shown in FIG. 4B. This machine models the pronunciation of a feneme as a Markov process. All fenemic phone machines have the structure illustrated in FIG. 4B; two states, Si and Sf, and three transitions, tr1, tr2 and tr3. Each of the transitions tr1 and tr2 has a transition probability and a vector of 200 probability values representing the probability that any of the 200 fenemes may be produced during the transition. The transition tr8 is a null transition. Fenemic phone machines may be concatenated in the same manner as phonemic phone machines to generate Markov models describing the pronunciation of a word. These models may be produced automatically by replacing the fenemes, in a feneme sequence representing a word, by respective fenemic phone machines. The fenemic phone machine is presented as an alternative to the phonetic phone machines. In the discussion of the speech recognition system shown in FIG. 3, all references to phone machines are to phonetic phone machines.

In the detailed match processor 1008, the sequence of labels produced by the acoustic processor 1004 is matched to the sequences of phone machines associated with the respective candidate words produced by the fast match operation. An exemplary matching procedure which may be used in both the fast match processor 1006 and the detailed match processor 1008 is the well known "forward probability" technique described in an article by F. Jelinek, entitled "Continuous Speech Recognition by Statistical Methods" *Proceedings of the IEEE*, Vol. 64, 1976, pp. 532–556.

The model shown in FIG. 4A is simplified, for use by the fast match processor 106, by replacing the each of the 200 value label probability vectors associated with the various transitions in the word model by a single 200 value probability vector. Each element in this vector is the largest corresponding value in all of the vectors used in the model. Many fewer calculations are needed to evaluate these simple phone machines than are needed to evaluate the more rigorous phone machines.

As set forth above, after both the fast match operation and the detailed match operation, the search processor 1020 invokes the language model 1010 to determine if the newly selected word fits in the context of the previously selected words. In addition to paring down the list of candidate words for application to the detailed match processor, the language model 1010 distinguishes between the set of homophones provided as a result of the detailed match operation. The language model used in the system shown in FIG. 8 is a three-gram language model, or, stated otherwise, a language model having statistics on the likelihood of occurrence of groups of three consecutive words.

The following example illustrates the operation of the language model 1010. Assume that the phrase "To be or not to be" has been spoken. After processing by the fast match and detailed match processor, a first homophone group, comprising "TO", "TOO" and "TWO" is determined by the search processor 1020. Since this is the start of the phrase, no context is available and so, the language model 1010 is invoked as a one-gram language model, providing the relative provbabilities of occurrence of the three words in the first homophone group. This homophone group is stored by the search processor 1020. When the next word is processed by the system, a second homophone group containing the words "BE", "BEE", "B" and "D" may be produced. The letter "D" is included in this group because it is a near-homophone of the other "B" words; in other words, even though it is not a homophone of the "B" words, it is treated as one because it cannot be reliably distinguished from them using the statistical models. Based on these two groups of words, the words "TOO" and "BEE" are eliminated as being unlikely. This leaves three possible two-word combinations: "TO BE", "TWO B" and "TWO D". The next word applied to the recognizer produces a third homophone group containing the words "OR", "OAR" and "ORE". Applying this group and the possible two-word combinations to the language model eliminates the word "TWO" from the first group, the words "B" and "D" from the second group and the words "OAR" and "ORE" from the third group. This process continues until the entire phrase has been parsed.

The sequence of words determined by the search processor 1020 using the fast match processor 1006, the detailed match processor 1008 and the language model 1010, as outlined above, is the output of the speech recognition system.

As set forth above, this prior art speech recognition system may have difficulty recognizing continuously spoken words because it uses phone machines that have fixed probability values for the fenemes produced at transitions between states. When the coarticulation of two words changes in the pronunciation of a constituent phoneme of one of the words, the detailed match processor may consider that pronunciation to be an unlikely match to a correct target phoneme represented by the fixed phone machine model. In this instance, the speech recognition system may produce an erroneous result.

The embodiment of the invention described below provides a solution to this problem. In this embodiment, a phonological rules processor (PRP) 1030 is included in the speech recognition system. This processor develops, from the training data, phonological rules regarding the pronunciation of phonemes in context. These rules, which account for, among other things, coarticulation effects, are applied to the detailed match processor 1008 to change the phone machines used by the processor 1008 based on the context of the words to be recognized.

The PRP 1030 used in this embodiment of the invention is a programmed digital computer, which is desirably separate from the search processor 1020 The PRP 1030 communicates with the search processor 1020 via a PRP interface circuit 1032. The PRP 1080 operates in two modes, a training mode in which it develops phonological rules from a known text and an operational mode in which it uses these phonological rules to recognize unknown spoken words.

The following is a summary of the operation of the PRP 1030. Details of the program controlling the PRP 1030 are set forth below in reference to FIGS. 6A through 9D. In its training mode, the PRP 1080 determines which feneme sequences in the training text represent which phonemes. The feneme sequences for each phoneme are then clustered into groups which represent similar pronunciations of the phomeme. The last step in the training mode generates a binary decision tree which predicts the pronunciation of a phoneme based on the context in which it occurs. The left (L) context; i.e. those phonemes preceding the target phoneme, the right (R) context; i.e. those phonemes following the target phoneme; and the length of the word, in syllables, in which the target phoneme occurs are used as contextual indicators in generating the graph.

In its operational mode, the PRP 1080 is provided, by the search processor 1020, with the current L context and with a phonetic baseform of a target word. Based on this information, the processor 1030 finds sequences of fenemic phone machines that define baseforms for respective phonemes in the target word. These fenemic baseforms are applied to the detailed match processor 1008. The detailed match processor 1008 forms a Markov model of the word by concatenating these fenemic baseforms, and then uses the model to determine the likelihood that a feneme sequence to be recognized represents the target word.

Figure 6A:
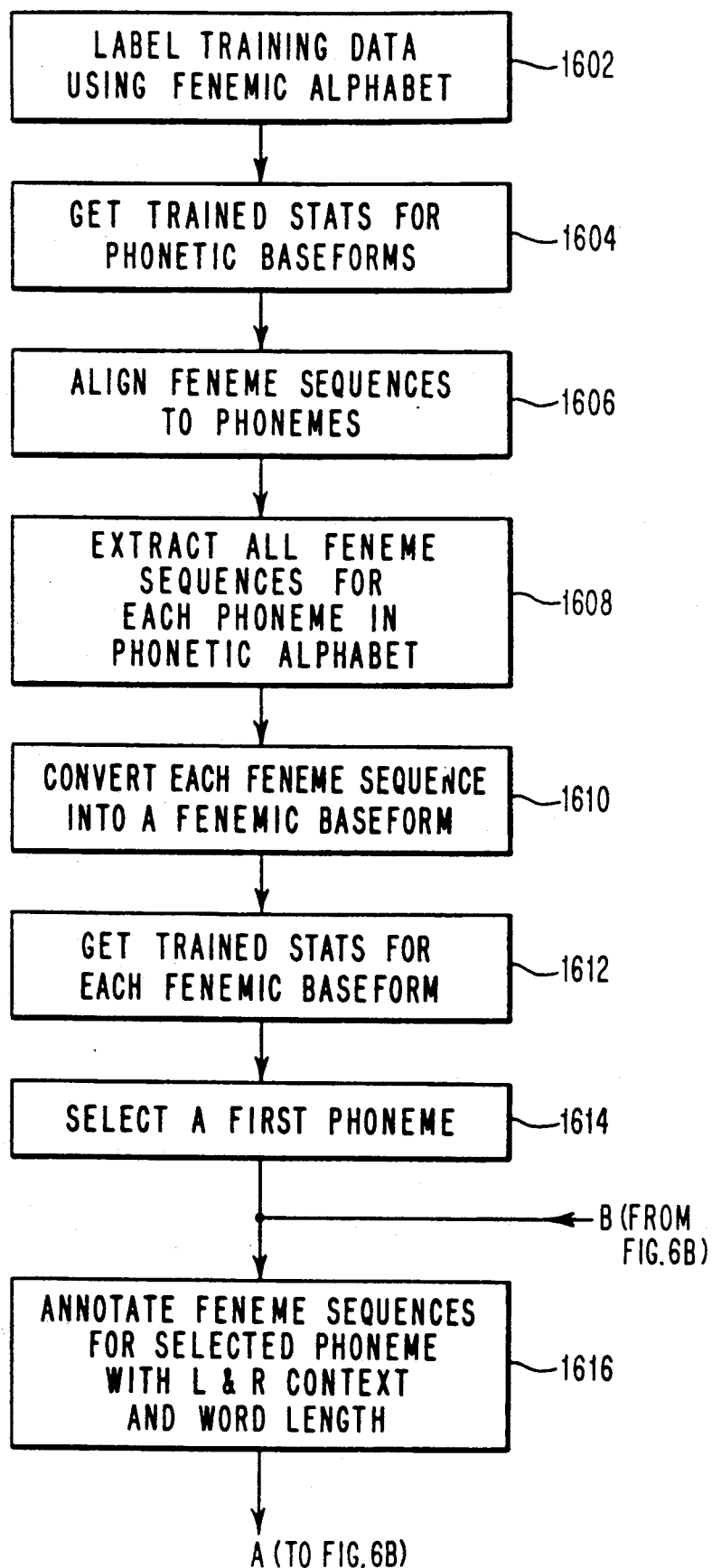
FIGS. 6A, 6B and 6C are flow-chart diagrams which illustrate the operation of the phonological rules generator shown in FIG. 5.
Figure 6B:
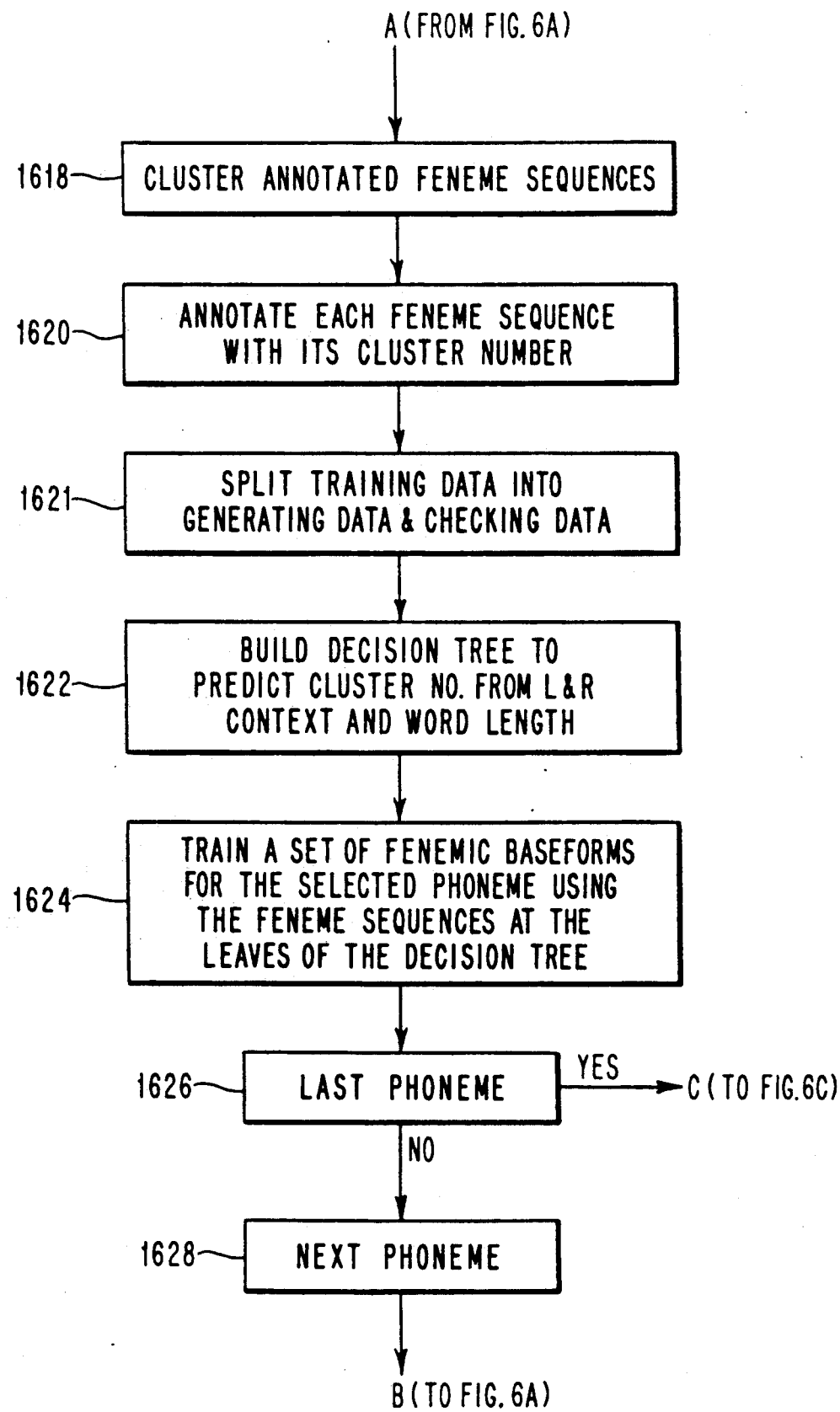
Figure 6C:
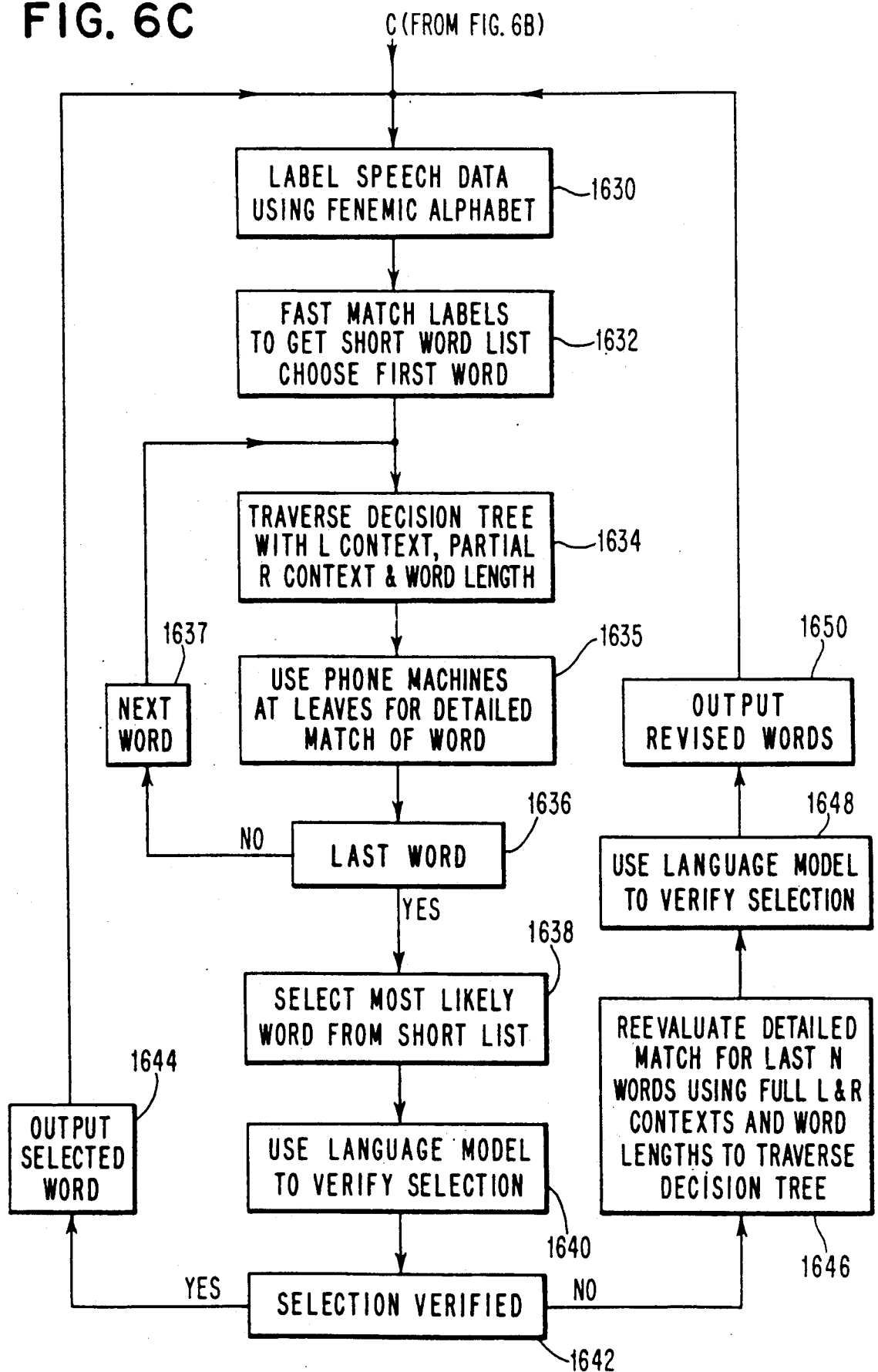

FIGS. 6A, 6B, and 6C constitute a flow-chart diagram which describes the program controlling the PRP 1030. FIGS. 6A and 6B describe the training mode and FIG. 6C describes the operational mode. In step 1602 of FIG. 6A. all of the training data is labeled using the fenemic alphabet. This procedure differs from the normal labeling of input data as it is received because the steps below, which define the phonological rules, access this data repeatedly. The next step, 1604, uses the labeled training data, a known text represented by the training data and an alphabet of phonetic baseforms to gather statistics which define phonetic phone machines corresponding to the phonetic baseforms. These statistics may be determined, for example, by using the well known forward-backward algorithm to apply the labeled training data to the phonetic baseforms as indicated by the known text. Next, the phonetic phone machines defined by this process are aligned, at step 1606, to feneme sequences in the labeled training data. This alignment operation uses the well known Viterbi alignment algorithm. The forward-backward algorithm and the Viterbi alignment algorithm are described in a paper by L. R. Bahl et al. entitled "A Maximum Likelihood Approach to Continuous Speech Recognition" *IEEE Transactions on Pattern Analysis and Machine Intelligence*, vol. 5, No. 2, March 1983, pp. 179–190.

The next step, 1608, extracts all feneme sequences corresponding to individual phonemes in the training text. These feneme sequences are grouped according to the phonemes they represent. The sequences in a particular group correspond to different possible pronunciations of the phomeme associated with that group.

At step 1610, a fenemic baseform is generated for each feneme sequence in each group. This operation copies the feneme sequence converts the fenemes in the copied sequence into fenemic phone machines and then concatenates the fenemic phone machines to generate a fenemic baseform. An exemplary fenemic phone machine is described above in reference to FIG. 4B. Each baseform represents a sequence of fenemic phone machines which models the pronunciation of the particular phoneme from which the underlying feneme sequence was derived. In the next step, 1612, the forward-backward algorithm is used to get trained statistics for the constituent fenemic phone machines in each fenemic baseform. These trained statistics are used, as set forth below, to cluster the fenemic phone machines.

The program, at step 1614, selects a first phoneme and its corresponding group of fenemic baseforms to generate a set of phonological rules that describe contextual differences in the pronunciation of the phoneme. The step 1616 begins this operation by annotating each feneme sequence in the chosen group with its L and R context and with the length of the original word from which the feneme sequence was derived. In this embodiment of the invention, the L context includes five phonemes occurring in the training text before the original phoneme from which the sequence was derived and the R context includes the five phonemes occurring after the original phoneme. After executing the step 1616, the program transfers control to the step 1618 of FIG. 6B as illustrated by the connector A in FIGS. 6A and 6B.

In the step 1618, the program clusters the feneme sequences in the selected group using their associated fenemic baseforms. This step associates feneme sequences which represent similar pronunciations of the selected phoneme into respectively different sub-groups, called clusters. Each of these clusters is assigned a unique identifying number. The clustering operation for the fenemic sequences is described below in reference to FIG. 7.

At step 1620, the program annotates each feneme sequence in the group with its cluster number. Each cluster number indicates a class of similar pronunciations of the selected phoneme.

A step 1621, following step 1620 divides the training data into two parts, the first part, called generating data, is used to generate questions for the binary decision tree, as set forth below. The second part, called checking data, is used to ensure that the questions produced using the generating data are generally valid and not just valid for the specific set of generating data.

The next step, 1622, uses the generating and checking data to build a decision graph which may be used to predict a cluster number from the L and R contexts and word length data of a given feneme sequence. In this embodiment of the invention, the decision graph is a binary tree based idiot-system having pylonic conditions. An idiot-system is a self-taught expert system, that is to say, an expert system constructed without expert guidance. In general terms, this graph partitions the feneme sequences in a group into subsets located at the leaves of the tree, each feneme sequence in a subset represents substantially the same pronunciation of the phoneme. The construction of the decision tree is described below in reference to FIGS. 8A through 8D, 9A and 9B.

The decision tree is traversed to reach a subset by asking questions about the context of the given feneme sequence. These questions are automatically generated and are arranged in "pylons" at the nodes of the tree. A pylon, as explained below in reference to FIGS. 8A and 8B, divides data at a node into two proper subsets. Ideally, these subsets contain approximately equal numbers of different clusters. However, even when the subsets are not equal, the division produced by the pylon tends to result in an increase in the information known about the contents of each child subset relative to that known about their parent subset The construction of the binary tree continues until the automatic rules generator cannot extract any more information from the annotated feneme sequences. When tree construction has ceased, each leaf of the tree includes a set of feneme sequences which describe a pronunciation of the selected phoneme in a set of contextual circumstances.

The next step in the program, 1624, generates a set of baseforms for the phoneme, one baseform for each leaf of the decision tree. Each of these baseforms consists of a sequence of fenemic phone machines. A baseform may be generated, for example, by generating one or more generic baseforms from all of the different fenemic sequences at a leaf node and then gathering statistics on the fenemic phone machines which constitute the generic baseforms using the forward-backward algorithm.

After generating the fenemic baseforms for each leaf of the decision tree for the selected phoneme, the program, at step 1626, determines if the selected phoneme was the last one in the phoneme alphabet. If not, the program selects the next phoneme in the alphabet and then branches, via connector B, back to step 1616 of FIG. 6A to generate a decision tree for the newly selected phoneme. If, however, the selected phoneme at step 1626 is the last one in the alphabet, the program branches, via the connector C to step 1630 of FIG. 6C.

Figure 5:
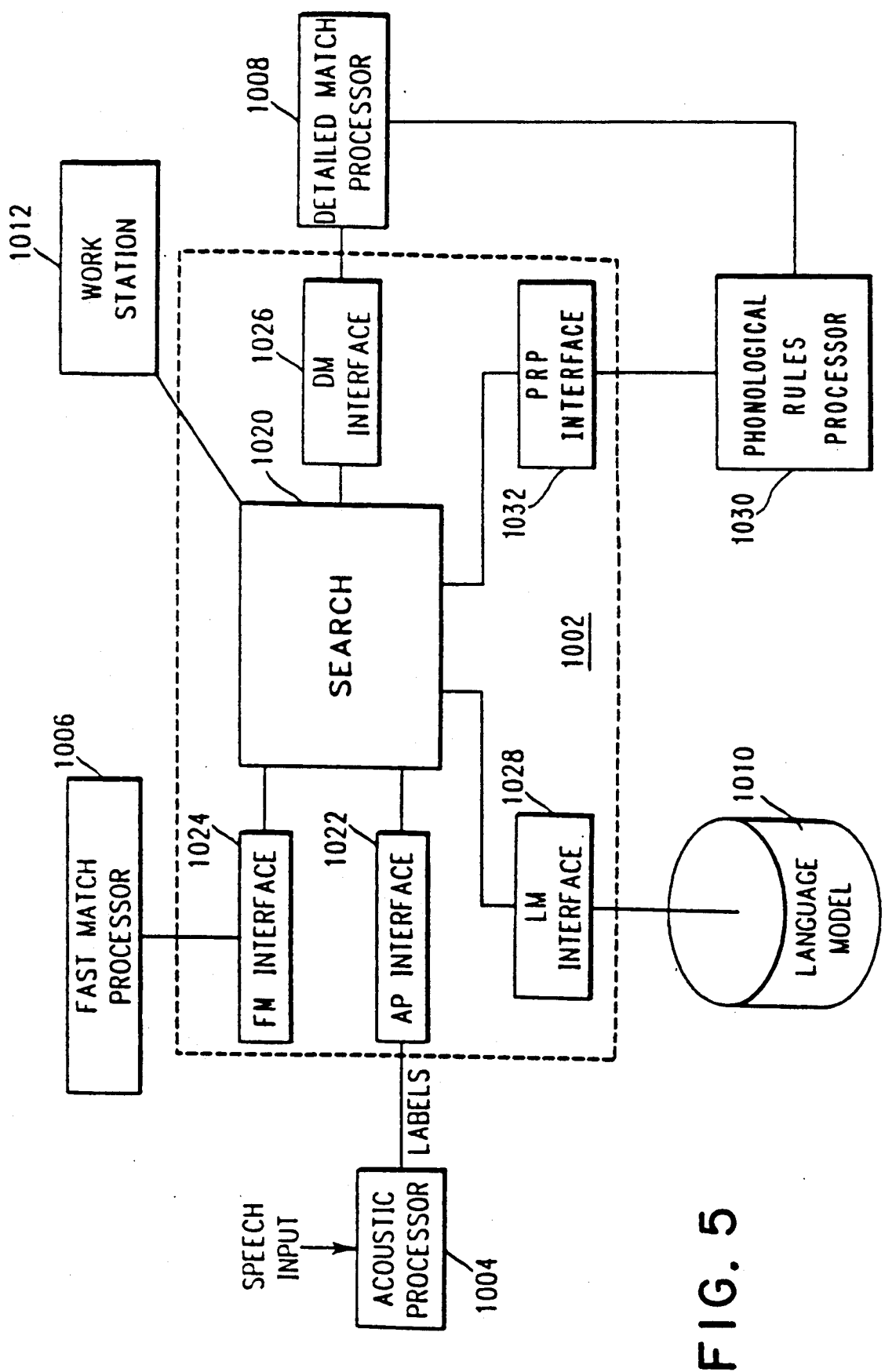
FIG. 5 is a block diagram of a speech recognition system which includes an embodiment of the present invention.

The flow-chart diagram in FIG. 6C illustrates the operation of the speech recognition system shown in FIG. 5. At step 1630, received utterances are labeled by the acoustic processor 1004 using the fenemic alphabet, as set forth above in reference to FIGS. 1 and 2. Next, at step 1632, a sequence of fenemes (labels) generated in response to an utterance is applied to the fast match processor 1006, which operates as set forth above, to provide a preliminary set (short list) of likely words which the sequence of labels may represent.

Phonetic baseforms for each of these words and the relevant L context, obtained from the previously recognized words are applied to the phonological rules processor 1030 by the search processor 1020. At step 1634, the processor 1030 uses the word length, in syllables, of the applied word, the supplied L context and partial L and R contexts derived from the applied baseform to find appropriate fenemic baseforms for the phonemes that constitute the word. The processor 1030 then, at step 1635, replaces the corresponding phonemic phone machines in the detailed match processor with a fenemic phone machine derived by concatenating the fenemic baseforms of the phonemes as determined from the decision tree.

Also at step 1635, the detailed match processor 1008 evaluates the target label sequence against the phonetic baseform of the applied word, as set forth above in reference to FIG. 3. However, using, instead of a phonemic phone machine, the detailed match processor uses a fenemic phone machine derived from fenemic baseforms supplied by the phonological rules processor 1030. An evaluation of this type is carried out for each word in the short list, as indicated by the steps 1636 and 1637. Values indicating the likelihood that the target label sequence matches each of the words are applied to the search processor 1020. These likelihood values are used by the search processor 1020, at step 1638, to select the most likely word from the short list as the word to be applied to the language model 1010.

The language model 1010 operates as set forth above to choose a word from among any homophones represented by the most likely phonetic baseform as determined by the search processor 1020. In addition, the language model 1010 may evaluate the sequence of previously recognized words to determine if any word in the sequence is unlikely.

If the sequence is found to be likely, at step 1642, the most recently recognized word is applied to the work station 1012 at step 1644. If, however, it is determined that the sequence is unlikely, at step 1646, the phonological rules processor 1030 and the detailed match processor 1020, may be used to reevaluate each word in the sequence against the other words in its short list. A more complete R context is available during this reevaluation step since likely words following each of the target words have been determined. This additional context may allow for a more accurate recognition of a word by allowing the phonological rules processor 1030 to provide a more accurate set of fenemic phone machines to the detailed match processor 1008.

At step 1648, each of the reevaluated selections is applied to the language model 1010 to choose a word from among its homophones. The resulting words are applied, at step 1650, to the work station 1012. After step 1644 and after step 1650, the program branches back to step 1630 to obtain a sequence of labels generated by the next utterance. The voice recognition process continues with this sequence of labels. To avoid unnecessary complexity, the voice recognition algorithm has been described as a serial process. However, it is contemplated that a pipelined process may also be used. In a pipelined system, the processing steps performed by the acoustic processor 1004, fast match processor 1006, detailed match processor 1008 and language model 1010 may be overlapped.

Figure 7:
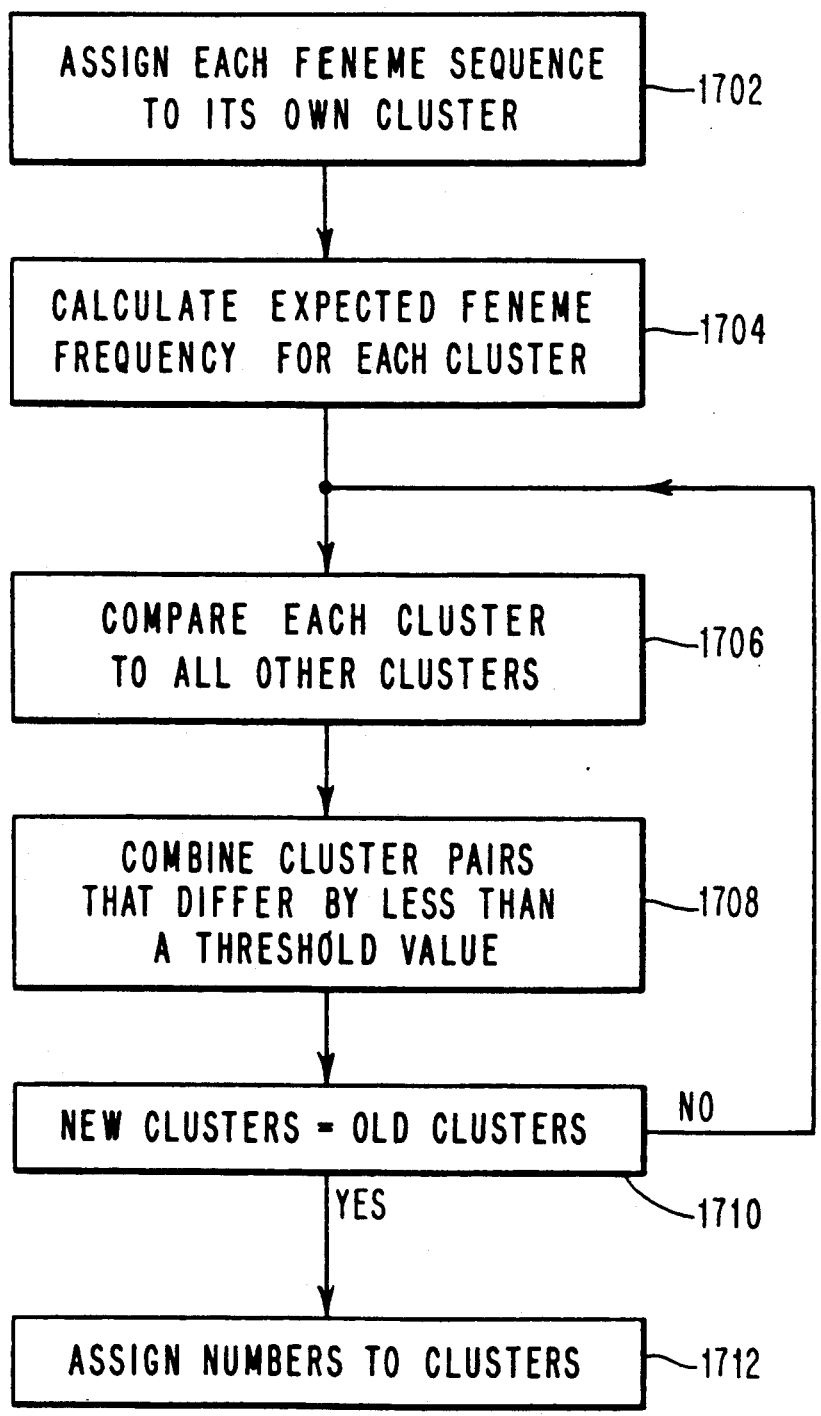
FIG. 7 is a flow-chart diagram illustrating a Poisson-polling procedure which may be used in the present invention.

As set forth above, FIG. 7 is a flow-chart diagram which provides more detail of step 1618 of FIG. 6B, i.e, the algorithm for clustering the the annotated feneme sequences. This algorithm is based on a model which treats the production of fenemes in a fenemic sequence as a Poisson process. In the algorithm, the fenemic phone machines generated in step 1612 of FIG. 6A provide, for each feneme sequence, an expected frequency of occurrence for each feneme in the feneme alphabet. In addition, the feneme sequences in the clusters provide an observed frequency of occurrence for each feneme in the alphabet. The expected and observed frequencies of two clusters are statistically compared to determine if it is likely that the observed sequences of two cluster were generated by the same fenemic phone machine. If this likelihood is above a predetermined threshold and if the clusters are mutually most similar, then, the clusters are combined. This process continues with the combined clusters until no more clusters can be combined.

The first step in this algorithm, 1702, establishes an initial set of clusters by assigning each feneme sequence to its own cluster. This step associates an observed feneme histogram —that of the feneme sequence—and a Markov model —that of the corresponding fenemic baseform—with each cluster. Next, at step 1704, expected frequencies, $\mu_i$, for each feneme, i, in the feneme alphabet are calculated using the an approximation defined by equation (1).

$$\mu_i = \sum_{j=1}^{N} x_j Pr(f_i | F_j) \tag{1}$$

In equation (1), $f_i$ denotes the $i^{th}$ feneme, $F_j$ denotes the $j^{th}$ fenemic phone, where there are a total of N phones in the phone alphabet $x_j$ denotes the observed frequency of $f_j$ in the histogram of the cluster, and $Pr(f_i | F_j)$ denotes the probability that the feneme $f_i$ is generated by the fenemic phone $F_j$ as determined from the Markov model.

The next step in the flow-chart of FIG. 7, step 1706, compares each cluster to all other clusters to determine whether the clusters should be joined into a single cluster. To perform this step, the program calculates a log likelihood ratio comparing the two clusters. If the log likelihood ratio is denoted by L, the function $-2L$ has an asymptotic chi-squared distribution. Accordingly, two clusters may be regarded as significantly different if the value of the function $-2L$ exceeds a constant K. This constant may be changed to change the number of clusters which are finally generated. In the present embodiment of the invention, the value of K is selected to produce between 50 and 100 clusters from approximately 3000 fenemic sequences. The equation (2) defines an approximation of the log likelihood ratio which has been determined by the inventors to produce acceptable results.

$$L = n_1 \sum_{i=1}^{N} \{x_i \ln \mu_i(M_3) - \mu_i(M_3)\} - \quad (2)$$

$$n_1 \sum_{i=1}^{N} \{x_i \ln \mu_i(M_1) - \mu_i(M_1)\} +$$

$$n_2 \sum_{i=1}^{N} \{y_i \ln \mu_i(M_3) - \mu_i(M_3)\} -$$

$$n_2 \sum_{i=1}^{N} \{y_i \ln \mu_i(M_2) - \mu_i(M_2)\}$$

In the equation (2), the terms $M_1$ and $M_2$ denote the two clusters which are being evaluated and the values $n_1$ and $n_2$ denote the respective numbers of feneme sequences in these two clusters. The term $M_3$ denotes a cluster which would be produced by combining the clusters $M_1$ and $M_2$. The variable i denotes one of the N fenemes in the feneme alphabet, the values $x_i$ and $y_i$ denote the means of the observed feneme frequencies for the feneme i in the respective clusters $M_1$ and $M_2$, and the terms $\mu_i(M_1)$, $\mu_i(M_2)$ and $\mu_i(M_3)$ denote the expected feneme frequencies for the feneme i in the respective clusters $M_1$, $M_2$ and $M_3$. Values for $\mu_i(M_1)$ and $\mu_i(M_2)$ may be determined using equation (1), values for $\mu_i(M_3)$ may be calculated using an approximation set forth in equation (3).

$$\mu_i(M_3) = \{n_1 \mu_i(M_1) + n_2 \mu_i(M_2)\}/(n_1+n_2) \quad 11 \text{ for } i=1 \text{ to } N \quad (3)$$

In step 1708, the values $-2L$ are determined for each cluster pair evaluated in step 1706 and the compared cluster pairs which have the smallest $-2L$ values that are less than the threshold value K are combined. The expected feneme frequency values for the combined clusters are the values $\mu_i(M_3)$ calculated using the equation (3).

At step 1710, the number of clusters after the combining operation of step 1708 are compared with the number that existed before step 1708. If these numbers not equal, the program branches to step 1706 to attempt to further combine the existing clusters. If these numbers are equal, however, no more clusters can be combined and the program branches to the step 1712 which assigns identifying numbers to the clusters. As set forth above, these identifying numbers are used, at step 1620 of FIG. 6B to annotate the feneme sequences.

Figure 8A:
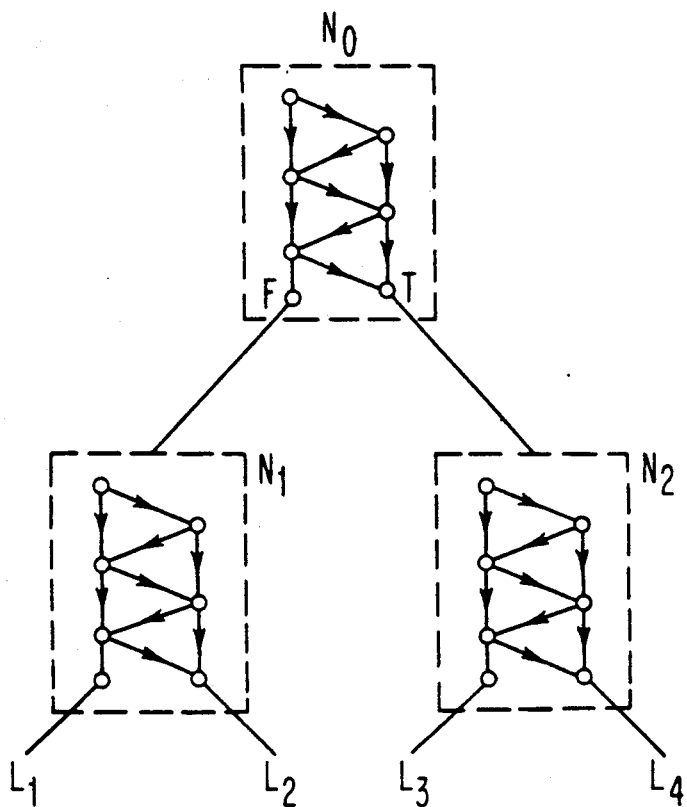
FIGS. 8A and 8B are diagrams useful for explaining the concept of a pylonic condition and of a binary tree having pylonic conditions.
Figure 8B:
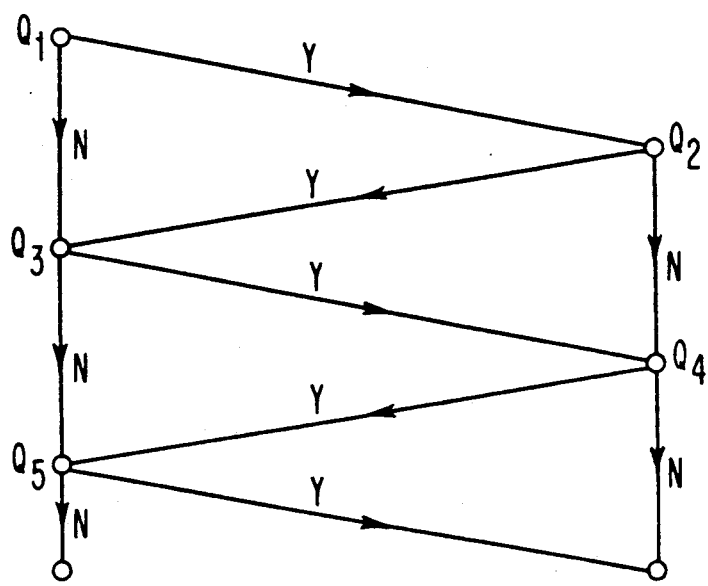

FIGS. 8A and 8B illustrate the concepts of a binary decision tree having pylonic conditions and of a pylonic condition, respectively. The tree structure shown in FIG. 8A has three decision nodes, N0, N1 and N2 as well as four leaf nodes, L1, L2, L3 and L4. Each decision node has associated with it a pylonic condition which is illustrated in more detail in FIG. 8B. To build a decision tree of the type shown in FIG. 8A, a set of data, in this instance a set of annotated feneme sequences, is used to generate a pylonic condition, for example, the one at node N0. This condition divides the data into two distinct portions, one (i.e. N1) for which the pylonic condition evaluates to "true" and one (i.e. N2) for which it evaluates to "false." The data at the node N1 is then used to generate a second pylonic condition which divides that data into two portions, L1 and L2. In the same manner, the data at node N2 is used to generate a third pylonic condition which divides the data at node N2 into the two portions L3 and L4. In the present embodiment of the invention, the data at the leaf nodes, L1 through L4 represent respectively different ways of pronouncing a given phoneme based on the context in which the phoneme occurs.

FIG. 8B illustrates an exemplary pylonic condition. Generally, a pylonic condition comprises several questions, in this instance, five questions. Each of these questions has the form "is $x_i$ member of the set $S_i$," (i.e. $x_i \in S_i$), where $x_i$ denotes a particular contextual indicator for a feneme sequence being tested and $S_i$ denotes a set of possible values for that contextual indicator. For example, if the groups of feneme sequences being evaluated represent different pronunciations of the phoneme "B" an exemplary question may be, "is the feneme sequence followed by an 'R'", i.e. is the first phoneme in the right context of the target feneme sequence ($x_i$) a member of the set ($S_i$) of "R" phonemes.

For the first question shown in FIG. 8, Q1, all of the data used to generate the question is marked "false". When the question is evaluated, some of this data—that for which the answer to the question is "yes"—is marked "true." The question is deemed to be effective if it causes the data to be predicted, i.e. the cluster number, to be segregated between the data now marked "true" and "false". Stated in another way, if, the set of "false" data after the question has a significantly greater proportion of sequences annotated with the cluster number Q than the set of "true" data, or vice-versa, then the question is deemed to be effective. This concept of segregation is known in information theory as a reduction in the entropy of the data, since more is known about the composition of the data in each of the subsets than was known about the composition of the data in the original set. A question is included in a pylonic condition only if it is found to be an effective question.

The data marked "true" by the question Q1 is then used to evaluate a question Q2. The question Q2 may change some of the "true" data to "false". The efficacy of the question Q2 is evaluated in the manner described above and, if the question is determined to be effective, the question is kept. Data marked "false" by the equation Q2 is combined with the data that remained "false" after Q1 was evaluated. This combined data is then used to evaluate a question Q3. "True" data determined by Q3 is combined with the data that remained "true" after Q2 was evaluated and the combined data is used to evaluate a question Q4.

This process continues until no more questions can be found that further reduce the entropy of the data marked "true" and "false." When this occurs, for example in node N0 of FIG. 8A, the data marked "false" is operated on in a similar manner to generate the pylonic condition at node N1 and the data marked "true" is operated on to generate the pylonic condition at node N2. Leaf nodes, for example, L1 through L4, are produced when no questions can be found that further reduce the entropy of the data.

Figure 8D:
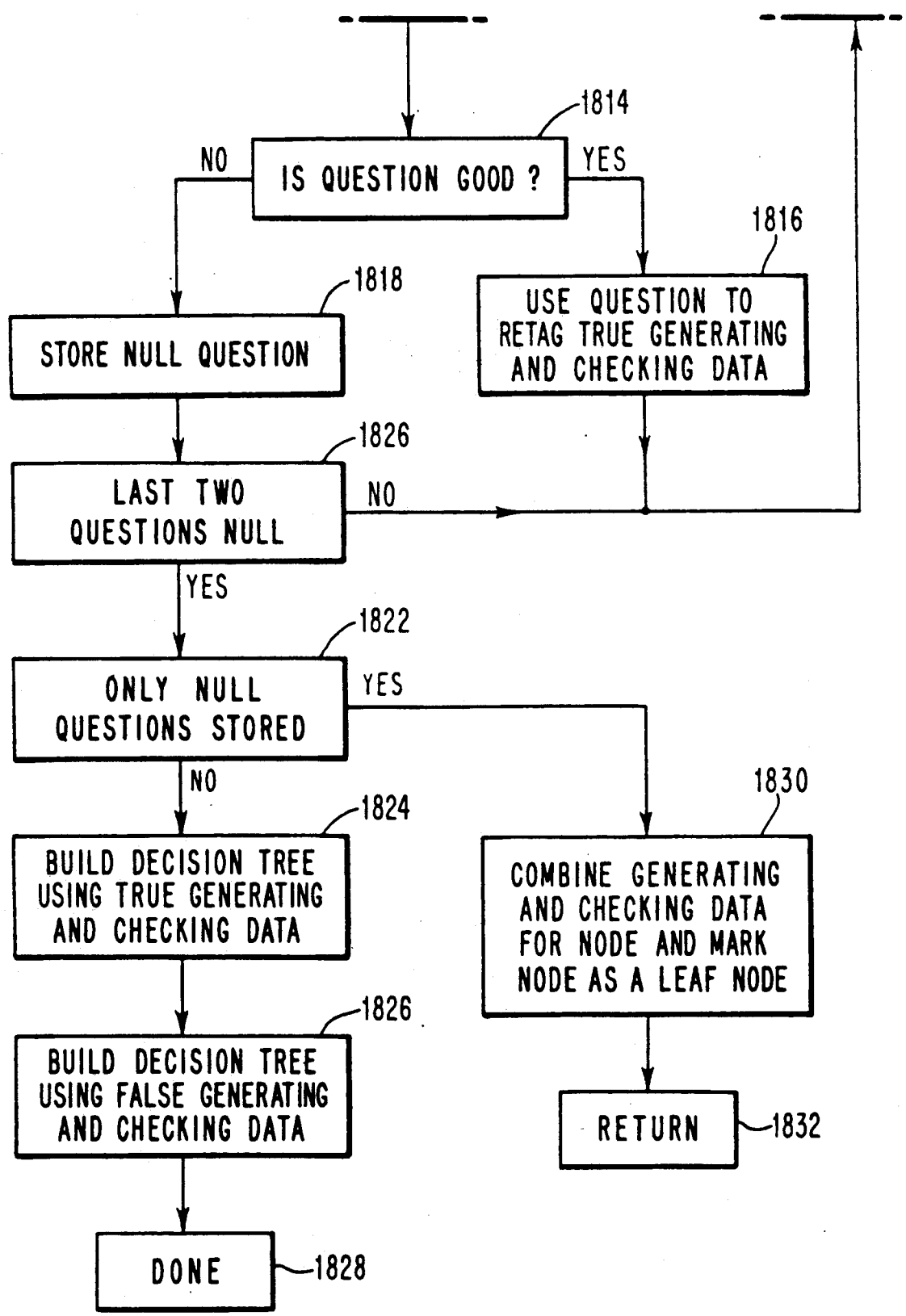

FIGS. 8C and 8D illustrate an exemplary algorithm for constructing the binary decision tree, described above in reference to step 1622 of FIG. 6B. The algorithm set forth in FIGS. 8C and 8D is a recursive algorithm, that is to say, one that may invoke a copy of itself. Each invocation of the algorithm splits a set of data into two proper subsets as determined by a pylonic question. In each invocation, the algorithm invokes itself once for each of the two developed subsets to determine if further division of the subsets is desirable. When the final invocations determine that no more divisions are desirable, the binary decision tree is complete.

The first step in this algorithm, 1802, marks all of the generating and checking data as "false". This action establishes an initial condition for the data used to generate and evaluate the pylonic questions.

The step 1804 generates a question of the form $x_i \in S_i$ which minimizes the conditional entropy of the generating data that is marked "false" and which produces a net reduction in the entropy of the checking data. The algorithm used in the step 1804 is described below in reference to FIGS. 9A and 9B. If this question is "good" as determined, at step 1804, step 1806 causes it to be stored in the pylon at step 1810. If it is not good, a null question, $x_i \in 0$, is added to the pylon at step 1808. The null question does not change any "true" data to "false" or any "false" data to "true." The question generated by the steps 1804, 1806, 1808 and 1810 is applied to data marked "false" to mark some of that data "true." Consequently, this question could only be one of the questions Q1, Q3 or Q5 described above in reference to FIG. 8B. Steps 1812, 1814, 1816 and 1818 are used to generate questions that operate on data marked "true" to mark some of that data "false".

Step 1812 finds a question of the type $x_i \in S_i$ which minimizes the conditional entropy of the data marked "true" and which produces a net reduction in the entropy of the checking data. If the question generated at step 1012 is "good" it is stored via steps 1814 and 1816 in the pylon (e.g. as Q2 or Q4 in the example shown in FIG. 8B). If the question is not "good" then the null question is stored at step 1818.

Following step 1818, step 1820 determines if the last two questions stored in the pylon were null. If they were not, some additional reduction in entropy may be had by adding more questions to the pylon. This condition is also met after step 1816 is executed. Accordingly, the "NO" branch of the step 1820 and the step 1816 both transfer control to step 1804 which generates the next question for the "false" data.

If, however, the last "true" question and the last "false" question were both the null question (i.e. the "YES" branch from the step 1820), then the step 1822 checks the questions that were stored in the pylon. If at least one non-null question wa stored in the pylon, the decision tree building algorithm invokes itself at step 1824, providing the generating and checking data that is marked "true" as the respective generating and checking data for the first invocation, and at step 1826, providing the generating and checking data that is marked "false" as the respective generating and checking data for the second invocation. Each of these invocations builds sub-nodes of the tree. The step 1824 builds the right sub-nodes, as illustrated in FIG. 8A, and the step 1826 builds the left sub-nodes.

If the step 1822 determines that only null questions were stored in the last pylonic condition, then, at step 1830, the generating data and checking data for the node are combined and the node is designated a leaf node After step 1830, a step 1832 is executed which returns control to the main program (i.e step 1624 of FIG. 6B). to step 1826 or to step 1828. depending on whether the decision tree generating algorithm was invoked at step 1622, 1824 or 1826, respectively.

Figures 9, 9A:
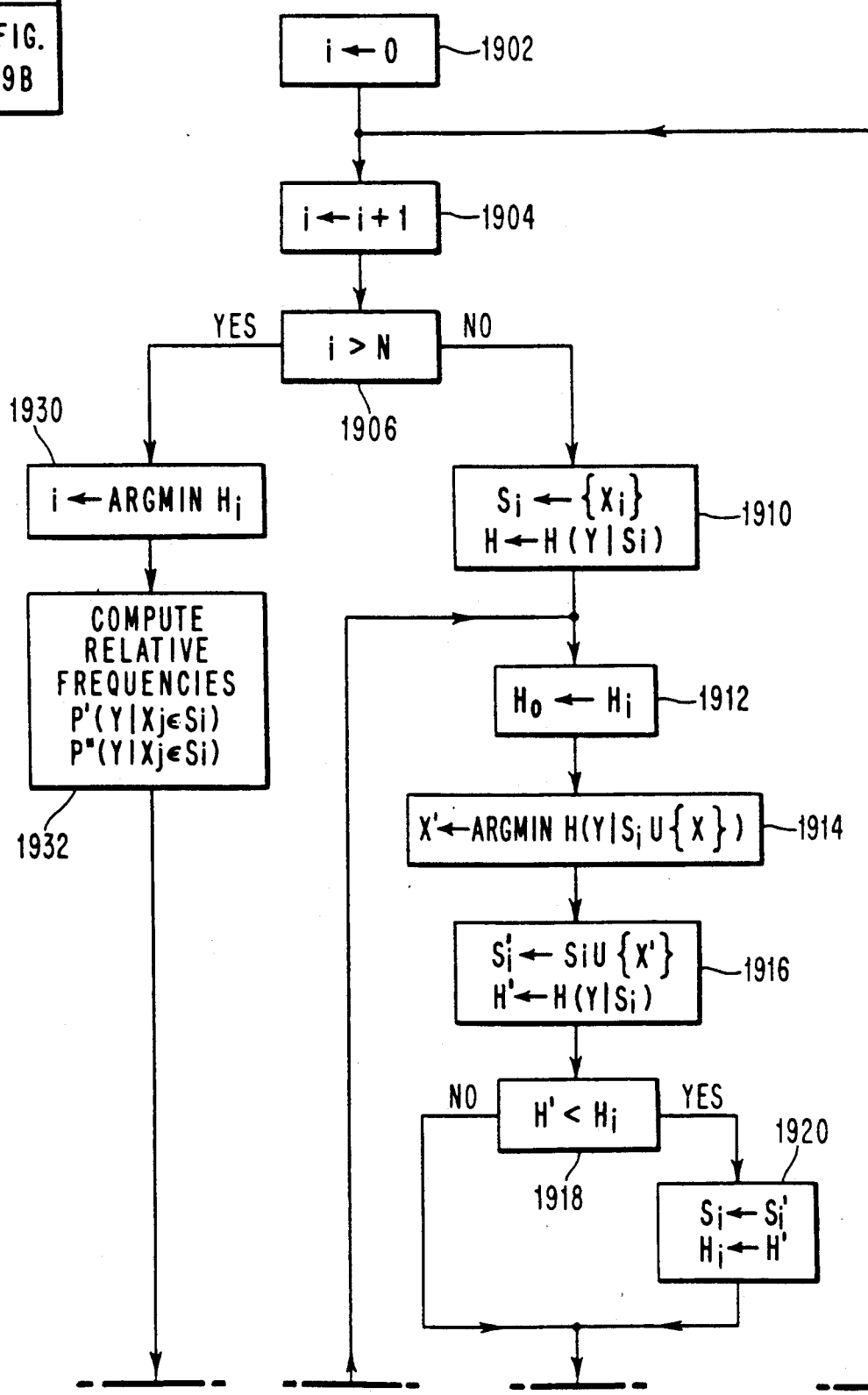
FIGS. 9A and 9B are flow-chart diagrams illustrating a method for defining a single component question of a pylonic condition.
Figure 9B:
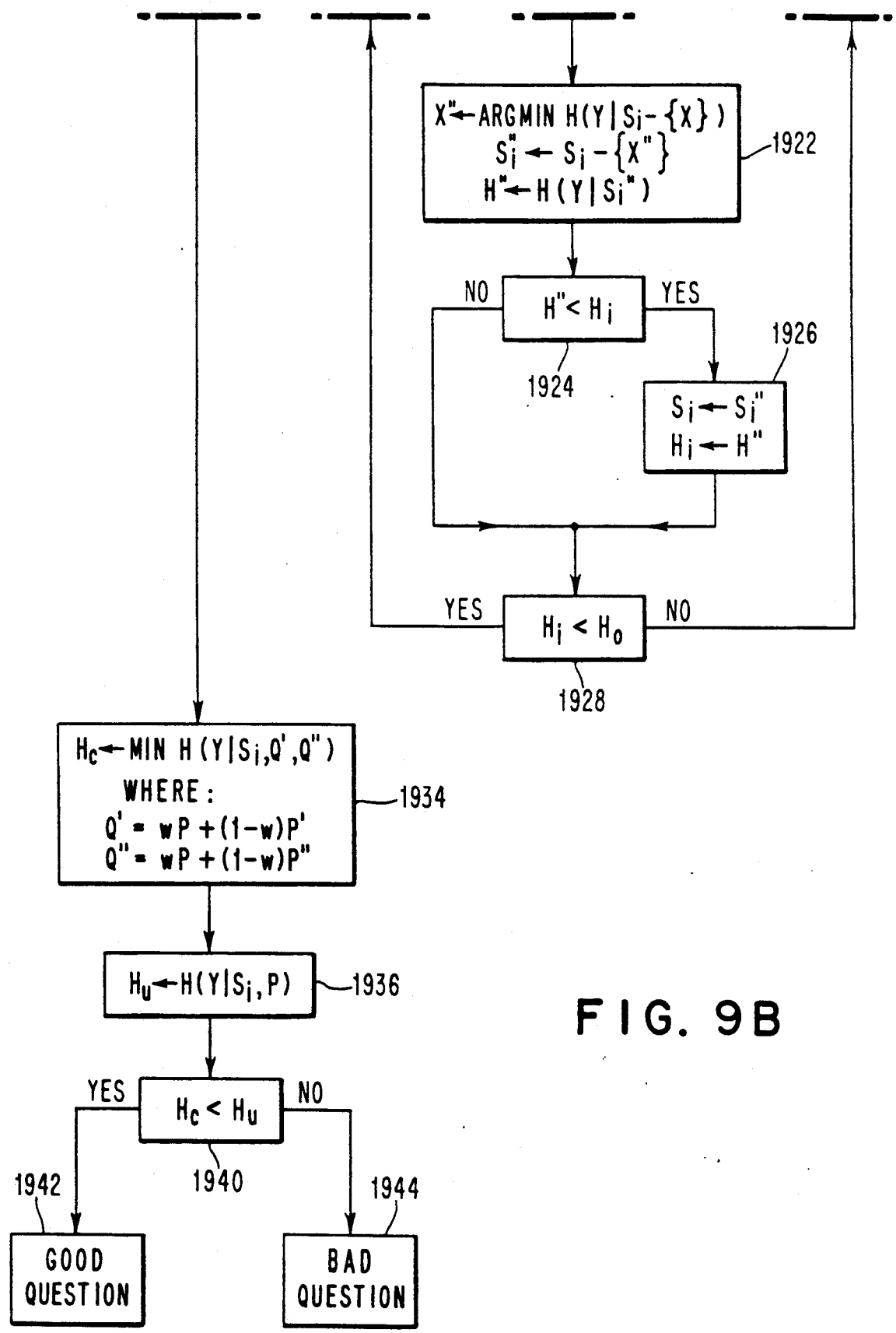

The algorithm for generating and checking individual questions for the pylonic condition is shown in FIGS. 9A and 9B. The object of this algorithm is to find a set, $S_i$, of values for a context variable, $x_i$, such that the question $x_i \in S_i$ divides the feneme sequences into subsets which yield as large a reduction in entropy as possible. To generate one question for a pylonic condition, the algorithm described below generates 11 questions, one for each context variable. Only one of these 11 questions is retained, the one which produces the largest reduction in entropy when applied to the generating data. This question is then verified on the checking data as set forth above in reference to step 1804 of FIG. 8C.

There are two types of sets $S_i$: phonemic, for the right and left context variables and numeric for the word length context variable. Initially, the set $S_i$ for a given context variable is empty, i.e. a null set. For phonemic sets, one phoneme at a time from the phoneme alphabet is tried as an initial or seed entry for the set. The algorithm then applies each possible phoneme in the phoneme alphabet, one at a time, as an addition to the set $S_i$ to determine which addition produces the largest reduction in entropy when the question is applied to the generating data. Next, each entry in the set is deleted on a trial basis to determine which one deletion produces the largest reduction in entropy for the generating data. This process continues, first trying to add a one new entry to the set and then trying to delete one existing entry from the set until no further reduction in entropy is noted. This question is selected as the best question for the given context variable. The generation of a set $S_i$ for the word-length context variable procedes in the same manner outlined above, except that possible word lengths, in syllables, are substituted for phonemes from the phoneme alphabet.

When 11 questions have been found, one for each of the 11 context variables, the question which produces the largest reduction in entropy when applied to the qenerating data is selected as the "best" question. This best question, $x_i \in S_i$, is then tested on the checking data to ensure that there is a net reduction in the entropy of that data as well.

Entropy, as it is used herein, connotes a measure of the absence of information about a situation. In this instance, it is a measure of the absence of information, or disorder, in a set of annotated feneme sequences. The cluster number annotations of the set of sequences are used to determine the amount of disorder, or entropy, of the set and the context annotations are used to subdivide the set to produce subsets having less disorder than the parent set. An equation which defines the entropy H(Y) of a discrete random variable Y having n possible values, $y_1, y_2, \ldots, y_n$ is defined by equation (4).

$$H(Y) = - \sum_{i=1}^{n} Pr(Y = y_i) \log_2 Pr(Y = y_i) \qquad (4)$$

If X is another discrete random variable having m possible values, $x_1, x_2, \ldots, x_m$, then the average conditional entropy of Y given X is defined by equation (5).

$$H(Y|X) = - \sum_{j=1}^{m} Pr(X = x_j) \sum_{i=1}^{n} Pr(Y = y_i|X = x_j) \log_2 Pr(Y = y_i|X = x_j) \qquad (5)$$

Given a sample of data for the random variable X, an estimate of the conditional entropy H(Y|X) can be obtained by replacing the probabilities in equation (5) by the frequencies of occurrence and relative frequencies of occurrence of the values $y_i$ and $x_j$ in this sample. In the description of the algorithm set forth below, the expression H(Y|S) where S is a set of data means an approximation of the conditional entropy of Y given X where the only $x_i$'s that are used as samples are $x_i$'s that are in the set S.

Before starting the question generating algorithm, it is assumed that two tables exist, one of all phonemes in the phoneme alphabet and one of all possible word lengths.

The first step in the question generating algorithm is to assign a value of 0 to the variable i. In the next step, 1904, the value of i is incremented. Step 1906 compares i to N, where N is the number of possible context variables. In the present embodiment of the invention, N equals 11. If at step 1906, i is less than N, step 1910 is executed to initialize the set $S_i$ to contain the first possible value, $v_1$, of the context variable $x_i$ and initialize the variable $H_i$ to contain the conditional entropy value of the random variable Y given the set of context values $S_i$. At step 1912, the value of $H_i$ is saved in a variable $H_o$. At step 1914, each possible context value is tried as an additional entry to the set $S_i$ to determine which one, when added to the set $S_i$, produces the largest reduction in conditional entropy of the random variable Y. In step 1916, the selected context value, designated v', is included with the elements of the set $S_i$ in a set S', and the minimum conditional entropy value determined at step 1914 is saved in a variable H'.

At step 1918, the value H' is compared to the value $H_i$ to determine if there has been a net reduction in entropy by adding the context value v' to the set $S_i$. If so, a step 1920 replaces $S_i$ with S' and replaces $H_i$ with H'. The next step, 1922, attempts to delete each entry in the set $S_i$ to determine if deleting any one entry would produce a net reduction in the conditional entropy of the random variable Y. The deleted context value which produces the lowest conditional entropy value is designated v''; the set of context indicators, $S_i$ minus v'', is designated S''; and the minimum conditional entropy value determined at step 1922 is designated H''. If, at step 1924, H'' is found to be less than $H_i$, step 1926 is executed which assigns S'' to $S_i$ and assigns H'' to $H_i$.

At step 1928, the value of $H_i$ is compared to the value $H_o$ that was saved at step 1912 to determine if there has been a net reduction in entropy of the generating data by adding v' to and/or deleting v'' from the set $S_i$. If there has been a net reduction, the YES branch of the step 1928 branches to step 1912 to attempt to further reduce the conditional entropy of Y by adding and/or deleting another context indicator as set forth above.

If, however, it is determined that there has been no reduction in entropy, the NO branch of step 1928 branches to the step 1904, which increments the variable i, to generate a set $S_i$ for the next context variable.

When N conditional entropy values, ($H_i$'s) have been determined, one for each of the N context variables, the step 1906 branches to the step 1930. Step 1930 finds the set $S_i$ which produced the largest reduction in entropy and assigns the index of that set to the variable i. Step 1932 then computes two relative frequency distributions, P' and P'', in the generating data based on the set $S_i$. P' is the relative frequency distribution of the random variable Y given that $x_j$ is a member of $S_i$, and P'' is the relative frequency distribution of the random variable Y given that $x_j$ is not a member of $S_i$. Thus these distributions relate to the "true" and "false" child nodes of the parent node described by the frequency distribution P.

The next step in the algorithm, 1934, calculates and sums the conditional entropies of the two child nodes using smoothed distributions, Q' and Q'', derived from the distributions P, P' and P'' as indicated by the equations (6) and (7).

$$Q'(Y|x_i \in S_i) = wP(Y) + (1-w)(P'(Y|x_i \in S_i)) \qquad (6)$$

$$Q''(Y|x_i \notin S_i) = wP(Y) + (1-w)(P''(Y|x_i \notin S_i)) \qquad (7)$$

The smoothed distributions Q' and Q'' are substituted into the equation (5) for the conditional frequency distributions $Pr(Y = y_i|X = x_j)$ to obtain two equations which are used to calculate the conditional entropies of the checking data at "true" and "false" child nodes, respectively.

The smoothed relative frequency distributions Q' and Q'' are used instead of the distributions P' and P'' because there may be context values which occur in the generating data for the parent node but do not occur in the generating data of one or the other of the child nodes. If, in this instance, the frequency distributions P' and P'' were used in the equation (5) to calculate the conditional entropy of one of the child nodes, the $\log_2$ factor in the equation (5) would have an invalid zero valued argument.

The smoothed distributions Q' and Q'' may be derived, for example, by changing the value of w from 0.1 to 1.0 in steps of 0.1 and choosing the value of w which minimizes the sum of the conditional entropies derived using the distributions Q' and Q''. This sum is a conditional entropy value which is assigned to a variable Hc, as indicated in step 1934.

The next step, 1936, uses the frequency distribution, P, of the parent node and the equation (4) to calculate the conditional entropy, Hu, of the checking data at that node. Step 1940 compares Hc and Hu. If Hc is less than Hu then the question has caused a net reduction in entropy for the checking data and the question is marked "good" at step 1942. Otherwise, the question is marked "bad" at step 1944. These marked indications are used at the steps 1806 and 1814 to selectively add a question to a pylonic condition as set forth above in reference to FIG. 8C.

As described above in reference to FIG. 6B when the phonological rules processor 1030 has generated the binary decision tree, it then the generates fenemic phone machines for each leaf of the tree. This process is represented by step 1624 of FIG. 6B. In the tree, each phoneme is represented by a set of leaves representing alternative pronunciations of the phoneme based on the context in which it occurs. Each of the phone machines produced in the step 1624 is a statistical model of an alternative pronunciation of the phoneme represented by one of the leaves.

Figure 10:
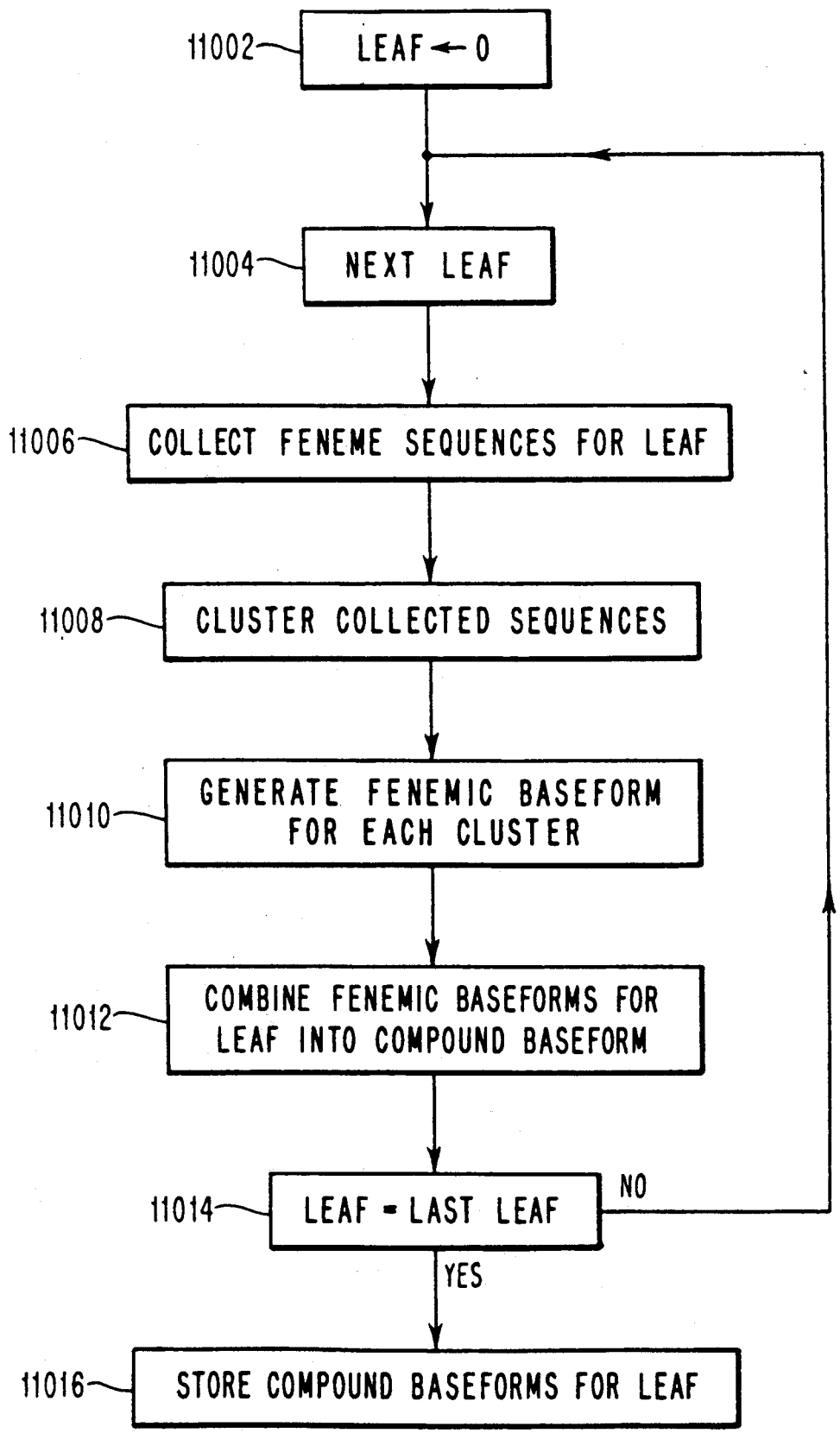

FIG. 10 is a flow-chart diagram that illustrates how the phonological rules processor 1030 uses the binary decision tree to generate these fenemic phone machines. The program illustrated by FIG. 10 access each leaf of the decision tree in turn using, for example, a recursive binary tree traversing algorithm. Algorithms of this type are well known in the art. In FIG. 10, this algorithm is represented by the subroutine call NEXT LEAF. By repeatedly invoking this subroutine, each leaf in the binary decision tree will be examined in turn.

The first step, 11002, in the program shown in FIG. 10. initializes the variable LEAF to 0. The next step, 11004, invokes the subroutine NEXT LEAF to select the first leaf in the tree. Step 11006 then collects all feneme sequences that belong to the selected leaf. These feneme sequences are clustered at step 11008 using the same algorithm described above in reference to FIG. 7. Assuming that the data used to generate and check the decision tree includes approximately 3000 feneme sequences for each phoneme, and that the binary decision tree partitions these 3000 sequences to form 50 to 100 leaves of leaves for each phoneme, the clustering step 11008 desirably divides the feneme sequences at each leaf into approximately five clusters.

Figure 10A:
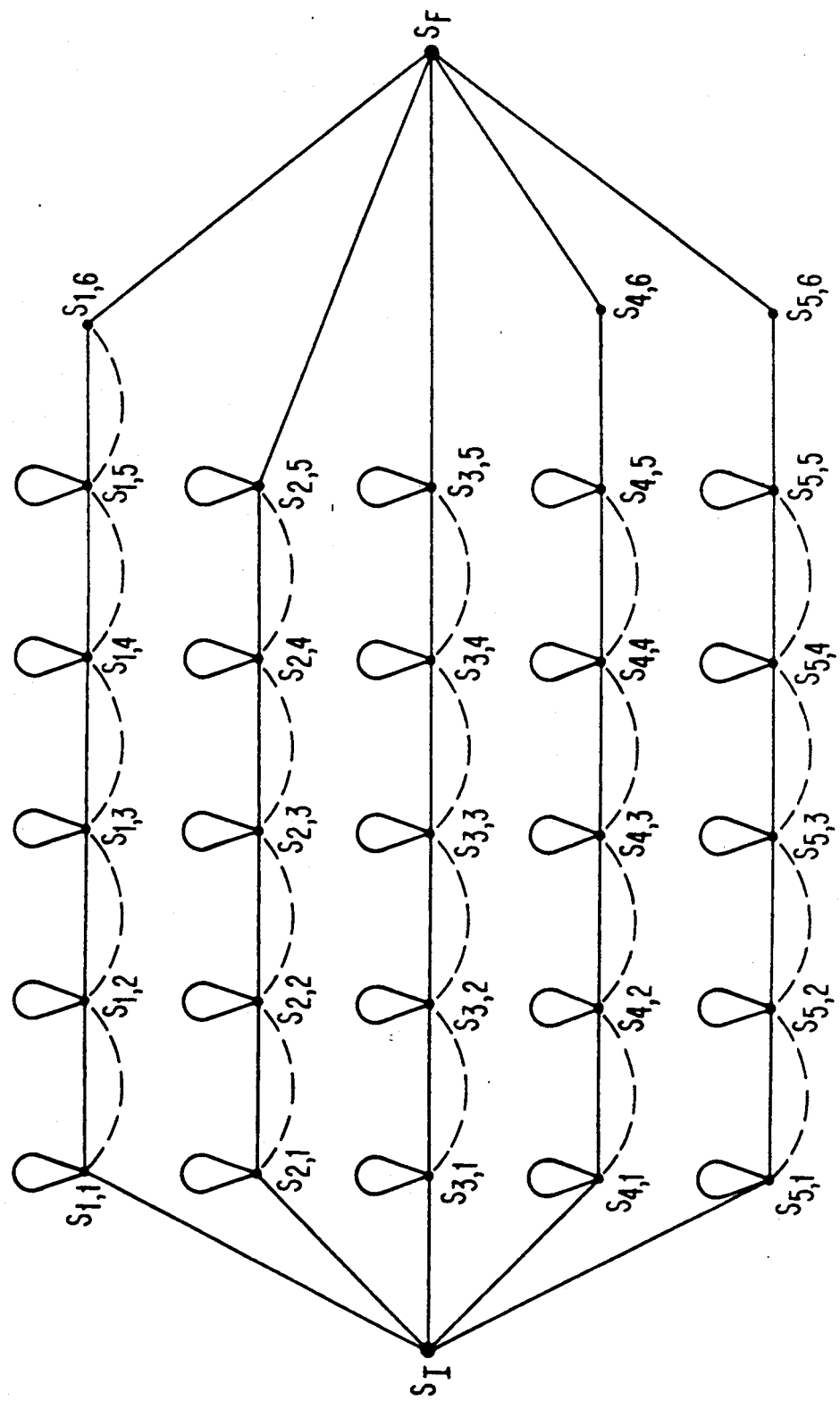

Step 11010 generates a fenemic baseform for each of the clusters in the selected leaf. This is accomplished using the forward-backward algorithm as described in the above-referenced paper by Jelinek et al. The next step 11012 connects these fenemic baseforms into a network which defines a compound baseform. The network is formed by defining artificial initial and final states with null transitions from this initial state to the first state of each fenemic baseform of the selected leaf and from the last state of each fenemic baseform to the artificial final state. A compound baseform is illustrated in FIG. 10A for a leaf having five clusters of fenemic sequences. Step 11014 tests the variable LEAF to determine if it represents the last leaf in the tree. If not, the program branches back to step 11004 to select the next leaf and generate its compound fenemic baseform. If step 11014 determines that the last leaf has been processed, step 11016 is executed which stores all of the compound baseforms in a table indexed to the leaves of the decision tree.

In its operational mode, the phonological rules processor 1030 is invoked for each of a sequence of phoneme in a phonetic word model provided by the fast match processor 1006. The supplied phonemes are annotated with their contexts. Using these context annotations, the processor 1030 locates the phonological leaf corresponding to each phoneme in the sequence. The compound fenemic baseforms for each leaf are concatenated to generate a fenemic phone machine for the entire word. This fenemic phone machine is applied to the detailed match processor as set forth above in reference to step 1635 of FIG. 6C.

A method and apparatus for generating and using phonological rules in a voice recognition system has been described above. It is contemplated that modifications and variations may be made to the disclosed method and apparatus without deviating from the scope of the invention which is defined by the claims appended hereto.

The invention claimed is:

1. A method for automatically separating vocalizations of language components into a plurality of groups representing pronunciations of the language components in respectively different contexts, said method comprising the steps of:
   A) processing a training text and vocalizations representing the training text to obtain a plurality of samples representing the language components of said vocalizations;
   B) selecting, from among the plurality of samples, a set of samples representing respective instances of a selected language component in the vocalizations;
   C) annotating each of said selected samples with a context indicator, representing at least one language component in a contextual relationship with the selected sample, to produce annotated samples;
   D) separating the selected samples into respectively different leaf groups based on the respective context indicators of said annotated samples, each of said leaf groups representing a pronunciation of said selected language component in a respectively different context.

2. The method of automatically separating vocalizations of language components set forth in claim 1 wherein:
   Step C) further includes the steps of:
   C1) grouping said annotated selected samples into a plurality of clusters, each cluster representing a respectively different pronunciation of said selected language component; and
   C2) further annotating each selected sample with an indicator of the cluster to which it belongs.

3. The method for automatically separating vocalizations of language components set forth in claim 2 wherein:
   said language components are phonemes;
   said samples are sequences of fenemes having distinct types, each of said sequences of fenemes corresponding to a respective one of said phonemes; and
   step C1) includes the steps of:
   C1a) assigning each sequence of fenemes to a respectively different prototype cluster;
   C1b) calculating respective expected frequency values for each type of feneme in each of the prototype clusters;
   C1c) statistically comparing the expected frequency values for the respective types of fenemes in each prototype cluster to the expected frequency values for the respective types of fenemes in all other prototype clusters to generate a plurality of statistical difference values, one for each pair of prototype clusters;
   C1d) combining pairs of prototype clusters that exhibit a statistical difference value which is less than a threshold value to generate new prototype clusters;
   C1e) repeating steps C1b through C1d until no pair of prototype clusters exhibits a statistical difference value which is less than the threshold value;

wherein each cluster corresponds to a respectively different one of the clusters of step C1.

4. The method for automatically separating vocalizations of language components set forth in claim 3 wherein the step C1c includes the steps of:
    generating a plurality of probabilistic models, each model representing a Markov model of the pronunciation of the phoneme represented by a respectively different one of said prototype clusters;
    generating a plurality of histograms, each histogram representing the relative frequency of occurrence of each feneme in a respectively different one of said prototype clusters;
    calculating, for each pair of prototype clusters, a log-likelihood ratio that the histograms for each prototype cluster in said pair match expected frequencies of the respective types of fenemes in a single probabilistic model representing a combination of the respective probabilistic models for said pair of prototype clusters, wherein a sign inverted version of said log-likelihood ratio is the statistical difference value for said pair of clusters.

5. The method for automatically separating vocalizations of language components set forth in claim 1, further comprising the step of generating, for each leaf group of said decision tree, a probabilistic model representing the pronunciation of he language component represented by the samples of said leaf group.

6. The method for automatically separating vocalizations of language components set forth in claim 5, wherein each of the samples is classified as to type and said probabilistic model has the form of a Markov model representing respective relative frequencies of occurrence of the samples of each type in the leaf group.

7. The method for automatically separating vocalizations of language components set forth in claim 5 wherein the step of generating a probabilistic model for each leaf group of the decision tree includes the steps of:
    grouping the samples of the leaf group into a plurality of clusters, each cluster representing a respectively different pronunciation of the language component represented by the samples of the leaf group;
    generating, from said plurality of clusters, a respective plurality of statistical models each of said statistical models having the form of a Markov model; and
    augmenting said plurality of statistical models by adding a common initial state and a common final state to each model to generate said probabilistic model.

8. In an automatic speech recognition system, a method for associating vocalizations of a continuously spoken sequence of words with respective language components, comprising the steps of:
    generating a sampled data signal representing the vocalizations of said continuously spoken sequence of words;
    A) associating a first language component with a first set of samples of said sampled data signal;
    B) associating a second set of samples of said sampled data signal with a second language component;
    C) accessing a decision means with the first language component as a context indicator to define a probabilistic model to be used to relate the second set of samples to the second language component, the probabilistic model defined by said decision means representing a distinct pronunciation of a selected language component in terms of a context provided for the selected language component;
    D) calculating, from said defined probabilistic model, a likelihood that the second language component corresponds to the second set of samples;
    E) repeating steps A) through D) for a plurality of second language components; and
    F) associating the one of the second language component and the plurality of second language components having the greatest likelihood with said second set of samples.

9. The method set forth in claim 8 wherein:
    step B) includes the step of calculating the likelihood that the second language component corresponds to the second set of samples, as defined by a context-independent probabilistic model representing the pronunciation of said second language component; and
    step C) includes the step of accessing a binary decision tree with said context indicator to define said probabilistic model.

10. The method set forth in claim 8 wherein:
    said probabilistic model has the form of a Markov model composed of a plurality of Markov submodels having common initial and final states.

11. In a speech recognition system, a method for dividing a set of sample values representing respective vocalizations into first and second groups of sample values using an automatically generated test question, the method comprising the steps of:
    A) annotating each of the sample values in said set with an indicator of a first attribute of said sample values;
    B) further annotating each of the sample values in said set with an indicator of a second attribute of said sample values, said set of further annotated samples having a predetermined entropy value measured with respect to said second attribute indicator; and
    C) generating the test question, in terms of the first attribute indicator of said further annotated samples, wherein, the test question is applied to divide the further annotated sample values into said first and second groups, wherein said first and second groups of samples have a combined entropy value, measured with respect to said second attribute indicator, that is less than said predetermined entropy value.

12. The method set forth in claim 11 wherein step C) includes the steps of:
    grouping the annotated sample values in said set into a plurality of clusters according to the second attribute of said sample values; and
    further annotating each of said annotated samples with an indicator of the cluster to which it belongs as said second attribute indicator.

13. The method set forth in claim 12, further including the steps of:
    generating a first further test question in terms of the first attribute indicator of the sample values in said second group which transfers sample values from said second group to said first group to form revised first and second groups of sample values having a reduced combined entropy value measured with respect to said second attribute indicator; and
    generating a second further test question in terms of the first attribute indicator of said sample values in said first group which transfers sample values from said first group to said second group to form further revised first and second groups of sample values having a further reduced combined entropy value measured with respect to said second attribute indicator.

14. The method set forth in claim 13, wherein:
said sample values are respective sequences of fenemes representing sequential vocalizations of phonemes;
said first attribute of said sample values relates to the phonemes occurring proximate in time with the respective phonemes corresponding to said sample values; and
said second attribute of said sample values relates to the vocalizations represented by said sequences of fenemes.

15. The method set forth in claim 12, wherein each samples value in said set of sample values includes a sequence of subsample values having distinct types and the step of grouping the annotated sample values in said set into clusters includes the steps of:
assigning each sample value to a respectively different prototype cluster;
calculating respective expected frequency values for each type of subsample in each of the prototype clusters;
statistically comparing the expected frequency values of each subsample type in each prototype cluster to the expected frequencies of each subsample type in all other prototype clusters to generate a plurality of statistical difference values, one for each pair of prototype clusters;
combining pairs of prototype clusters that exhibit a statistical difference value which is less than a threshold value to generate new prototype clusters.

16. The method set forth in claim 15 wherein the step of statistically comparing the expected frequency of each subsample type in each prototype cluster to the expected frequencies of all other subsample types in all other prototypes clusters includes the steps of:
generating a plurality of probabilistic models, each model representing a Markov model of the sequences of subsamples represented by a respectively different one of said prototype clusters;
generating a plurality of histograms, each histogram representing the relative frequency of occurrence of each type of subsample in a respectively different one of said prototype clusters;
calculating, for each pair of prototype clusters, a log-likelihood ratio that the histograms for each prototype cluster in said pair match the expected frequencies of subsamples in a single probabilistic model representing a combination of the respective probabilistic models for said pair of prototype clusters, wherein a sign inverted version of said log-likelihood ratio is the statistical difference value for said pair of clusters.

17. In a voice recognition system, a method for grouping a plurality of vocalizations, represented by respective sequences of samples having respective sample values, into clusters comprising the steps of:
A) assigning each sequence of samples to a respectively different prototype cluster;
B) calculating an expected frequency value for each sample value in each prototype cluster;
C) statistically comparing the expected frequency value of each sample value of each prototype cluster to the expected frequencies of all other sample values in all other prototype clusters to generate a plurality of statistical difference values, one for each pair of clusters;
D) combining pairs of prototype clusters that exhibit a statistical difference value which is less than a threshold value to generate new prototype clusters.

18. The method of groping a plurality of sequences of samples set forth in claim 17 further including the step of repeating steps B) through D) until no prototype clusters can be combined.

19. The method of grouping a plurality of vocalizations set forth in claim 18 wherein the step of statistically comparing the expected frequency of each sample value of each prototype cluster to the expected frequencies of all other sample value of all other prototype clusters includes the steps of:
generating a plurality of probabilistic models, each model representing a Markov model of the sequences of samples represented by a respectively different one of said prototype clusters;
generating a plurality of histograms, each histogram representing the relative frequency of occurrence of each sample value in a respectively different one of said prototype clusters;
calculating, for each pair of prototype clusters, a log-likelihood ratio that the histograms for each prototype cluster in said pair match the expected frequency values of sample values of a single probabilistic model representing a combination of the respective probabilistic models for said pair of prototype clusters, wherein a sign inverted version of said log-likelihood ratio is the statistical difference value for said pair of clusters.

20. Apparatus for automatically separating vocalizations of language components into a plurality of groups representing pronunciations of the language components in respectively different contexts, comprising:
sampling means for converting a training text and vocalizations of the training test into a plurality of samples representing the language components of said vocalizations;
means for selecting, from among the plurality of samples, a set of samples representing respective instances of a selected language component in the vocalizations;
processing means including means for annotating each of said selected samples with a context indicator representing at least one language component in a contextual relationship with the selected sample, to produce annotated samples;
means for separating the selected samples into respectively different leaf groups based on the respective context indicators of said annotated samples, each of said leaf groups representing a pronunciation of said selected language component in a respectively different context.

21. The appratus set forth in claim 20 wherein:
the processing means further includes:
means for grouping said annotated selected samples into a plurality of clusters, each cluster representing a respectively different pronunciation of said selected language component; and means for further annotating each selected sample with an indicator of the cluster to which it belongs.

22. The apparatus set forth in claim 21 wherein:

said language components are phonemes;

said samples are sequences of fenemes having distinct types, each of said sequences of fenemes corresponding to a respective one of said phonemes; and the means for grouping said annotated selected samples includes:

means for assigning each sequence of fenemes to a respectively different prototype cluster;

means for calculating respective expected frequency values for each type of feneme in each of the prototype clusters;

statistical comparison means for statistically comparing the expected frequency values for the respective types of fenemes in each prototype cluster to the expected frequency values for the respective types of fenemes in all other prototype clusters to generate a plurality of statistical difference values, one for each pair of prototype clusters; and means for combining pairs of prototype clusters that exhibit a statistical difference value which is less than a threshold value to generate new prototype clusters.

23. The apparatus of claim 22 wherein the statistical comparison means includes:

means for generating a plurality of probabilistic models, each model representing a Markov model of the pronunciation of the phoneme represented by a respectively different one of said prototype clusters;

means for generating a plurality of histograms, each histogram representing the relative frequency of occurrence of each feneme in a respectively different one of said prototype clusters;

means for calculating, for each pair of prototype clusters, a log-likelihood ratio that the histograms for each prototype cluster in said pair match expected frequencies of the respective types of fenemes in a single probabilistic model representing a combination of the respective probabilistic models for said pair of prototype clusters, wherein a sign inverted version of said log-likelihood ratio is the statistical difference value for said pair of clusters.

24. The apparatus of claim 20 further comprising means for generating a probabilistic model for each leaf group of the decision tree, including:

means for grouping the samples of the leaf group into a plurality of clusters, each cluster representing a respectively different pronunciation of the language component represented by the samples of the leaf group;

means for generating, from said plurality of clusters, a respective plurality of statistical models each of said statistical models having the form of a Markov model; and means for augmenting said plurality of statistical models by adding a common initial state and a common final state to each model to generate said probabilistic model.

* * * * *

UNITED STATES PATENT AND TRADEMARK OFFICE
CERTIFICATE OF CORRECTION

PATENT NO. : 5,033,087

DATED : July 16, 1991

INVENTOR(S) : Lalit R. Bahl, Peter F. Brown, Peter V. DeSouza, Robert L. Mercer

It is certified that error appears in the above-identified patent and that said Letters Patent is hereby corrected as shown below:

Column 24:

Claim 20, line 6, change "test" to --text--

Signed and Sealed this

Twenty-seventh Day of October, 1992

Attest:

DOUGLAS B. COMER

Attesting Officer     Acting Commissioner of Patents and Trademarks